United States Patent
Afrouzi et al.

(10) Patent No.: US 10,488,865 B2
(45) Date of Patent: *Nov. 26, 2019

(54) METHODS AND SYSTEMS FOR ROBOTIC SURFACE COVERAGE

(71) Applicant: AI Incorporated, Toronto (CA)

(72) Inventors: Ali Ebrahimi Afrouzi, Toronto (CA); Lukas Fath, Toronto (CA)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,393

(22) Filed: Nov. 21, 2018

(65) Prior Publication Data

US 2019/0094870 A1    Mar. 28, 2019

Related U.S. Application Data

(63) Continuation-in-part of application No. 15/619,449, filed on Jun. 10, 2017, now Pat. No. 10,343,280, which is a continuation of application No. 14/817,952, filed on Aug. 4, 2015, now Pat. No. 9,701,020.

(60) Provisional application No. 62/092,800, filed on Dec. 16, 2014, provisional application No. 62/666,266, filed on May 3, 2018, provisional application No.
(Continued)

(51) Int. Cl.
*G05D 1/00* (2006.01)
*G05D 1/02* (2006.01)

(52) U.S. Cl.
CPC ......... *G05D 1/0219* (2013.01); *G05D 1/0217* (2013.01); *G05D 1/0274* (2013.01); *G05D 2201/0203* (2013.01); *Y10S 901/01* (2013.01)

(58) Field of Classification Search
USPC .................................................. 700/245–264
See application file for complete search history.

(56) References Cited

U.S. PATENT DOCUMENTS

| | | | |
|---|---|---|---|
| 6,236,365 B1 * | 5/2001 | LeBlanc | G01C 21/206 342/457 |
| 8,930,023 B2 * | 1/2015 | Gutmann | G05D 1/0234 700/245 |

(Continued)

OTHER PUBLICATIONS

Kleiner et al., "A Solution to Room-by-Room Coverage for Autonomous Cleaning Robots", 2017 IEEE/RSJ International Conference on Intelligent Robots and Systems (IROS), Sep. 2017, pp. 5347 to 5352.

*Primary Examiner* — Jonathan L Sample

(57) ABSTRACT

Techniques for minimizing redundancy of surface coverage of a workspace by a robotic device are presented, the techniques including: obtaining, with one or more processors of a robot, a map of a workspace, the map quantizing the workspace into a plurality of cells, each cell corresponding to an area of the workspace; segmenting, with the one or more processors of the robot, the workspace into a plurality of zones, each zone having a subset of the plurality of cells; determining, with the one or more processors of the robot, a sequence of the zones among a plurality of candidate sequences based on an effect of the sequence on a cost of a cost function that is based on travel distance of the robot through the sequence; and causing, with the one or more processors of the robot, the robot to traverse the zones in the determined sequence.

23 Claims, 28 Drawing Sheets

Related U.S. Application Data

62/658,705, filed on Apr. 17, 2018, provisional application No. 62/644,708, filed on Mar. 19, 2018, provisional application No. 62/590,205, filed on Nov. 22, 2017.

(56) References Cited

U.S. PATENT DOCUMENTS

| Patent/Pub No. | | Date | Inventor | Classification |
|---|---|---|---|---|
| 9,250,081 | B2* | 2/2016 | Gutmann | G05D 1/0231 |
| 9,323,250 | B2* | 4/2016 | Wang | G05D 1/028 |
| 9,360,300 | B2* | 6/2016 | DiBernado | G01S 5/163 |
| 9,375,847 | B2* | 6/2016 | Angle | H04L 12/282 |
| 2004/0117079 | A1* | 6/2004 | Hulden | G05D 1/0217 701/23 |
| 2005/0159879 | A1 | 7/2005 | Graeve et al. | |
| 2005/0213082 | A1* | 9/2005 | DiBernardo | G01S 5/163 356/139.03 |
| 2006/0061478 | A1* | 3/2006 | Kim | G08B 17/10 340/628 |
| 2007/0096676 | A1* | 5/2007 | Im | G05D 1/0225 318/587 |
| 2007/0213892 | A1* | 9/2007 | Jones | A47L 11/00 701/23 |
| 2007/0271011 | A1* | 11/2007 | Lee | G05D 1/0242 700/245 |
| 2007/0285041 | A1* | 12/2007 | Jones | G05D 1/0219 318/568.12 |
| 2009/0055020 | A1* | 2/2009 | Jeong | G05D 1/0246 700/251 |
| 2009/0082879 | A1* | 3/2009 | Dooley | B25J 9/1658 700/3 |
| 2009/0149990 | A1* | 6/2009 | Myeong | G05D 1/0274 700/245 |
| 2009/0182464 | A1* | 7/2009 | Myeong | G05D 1/0246 701/25 |
| 2010/0049364 | A1* | 2/2010 | Landry | G05D 1/0272 700/245 |
| 2010/0063628 | A1* | 3/2010 | Landry | G05D 1/0272 700/258 |
| 2010/0293517 | A1 | 11/2010 | Graeve et al. | |
| 2010/0305752 | A1* | 12/2010 | Abramson | G01S 1/70 700/245 |
| 2011/0153136 | A1* | 6/2011 | Anderson | G05D 1/0219 701/25 |
| 2011/0167574 | A1* | 7/2011 | Stout | G05D 1/0219 15/3 |
| 2011/0202175 | A1* | 8/2011 | Romanov | A47L 11/4011 700/250 |
| 2012/0221237 | A1* | 8/2012 | Jung | G05D 1/0274 701/400 |
| 2012/0223216 | A1* | 9/2012 | Flaherty | A61L 2/10 250/214.1 |
| 2013/0006419 | A1* | 1/2013 | Bergstrom | A01D 34/008 700/245 |
| 2013/0040648 | A1* | 2/2013 | Yang | H04W 16/18 455/446 |
| 2013/0138246 | A1* | 5/2013 | Gutmann | G05D 1/0231 700/253 |
| 2013/0218342 | A1* | 8/2013 | Teng | G05D 1/0231 700/259 |
| 2013/0288692 | A1* | 10/2013 | Dupray | H04W 76/50 455/450 |
| 2014/0100736 | A1* | 4/2014 | Kim | G05D 1/0219 701/26 |
| 2014/0243012 | A1* | 8/2014 | Wirola | G01S 5/0263 455/456.1 |
| 2015/0323934 | A1* | 11/2015 | Lin | G01S 5/02 701/26 |
| 2016/0271795 | A1* | 9/2016 | Vicenti | B25J 9/163 |
| 2018/0164806 | A1* | 6/2018 | Pulling | G05D 1/0088 |

* cited by examiner

| Session (501) | Zone Division Method (502) | Order of Zones Serviced (503) | Net Rewards (504) |
|---|---|---|---|
| 1 | Random | A,B,D,F,E,H,C,G... | 250 |
| 2 | Largest possible zones | D,B,H,A,G,E,C,F... | 285 |
| 3 | Zones with area equivalent to approximately 3 sq. feet | B,D,A,H,F,C,E,G... | 195 |
| 4 | Zones of approximately equal size | B,A,G,E,C,F,D,H... | 190 |
| 5 | Random | H,F,C,E,B,A,G,D... | 268 |
| 6 | Zones with area less than 3.5 sq. feet | H,F,C,E,B,A,G,D... | 224 |
| 7 | Largest possible zones | D,B,H,E,A,G,C,F... | 292 |

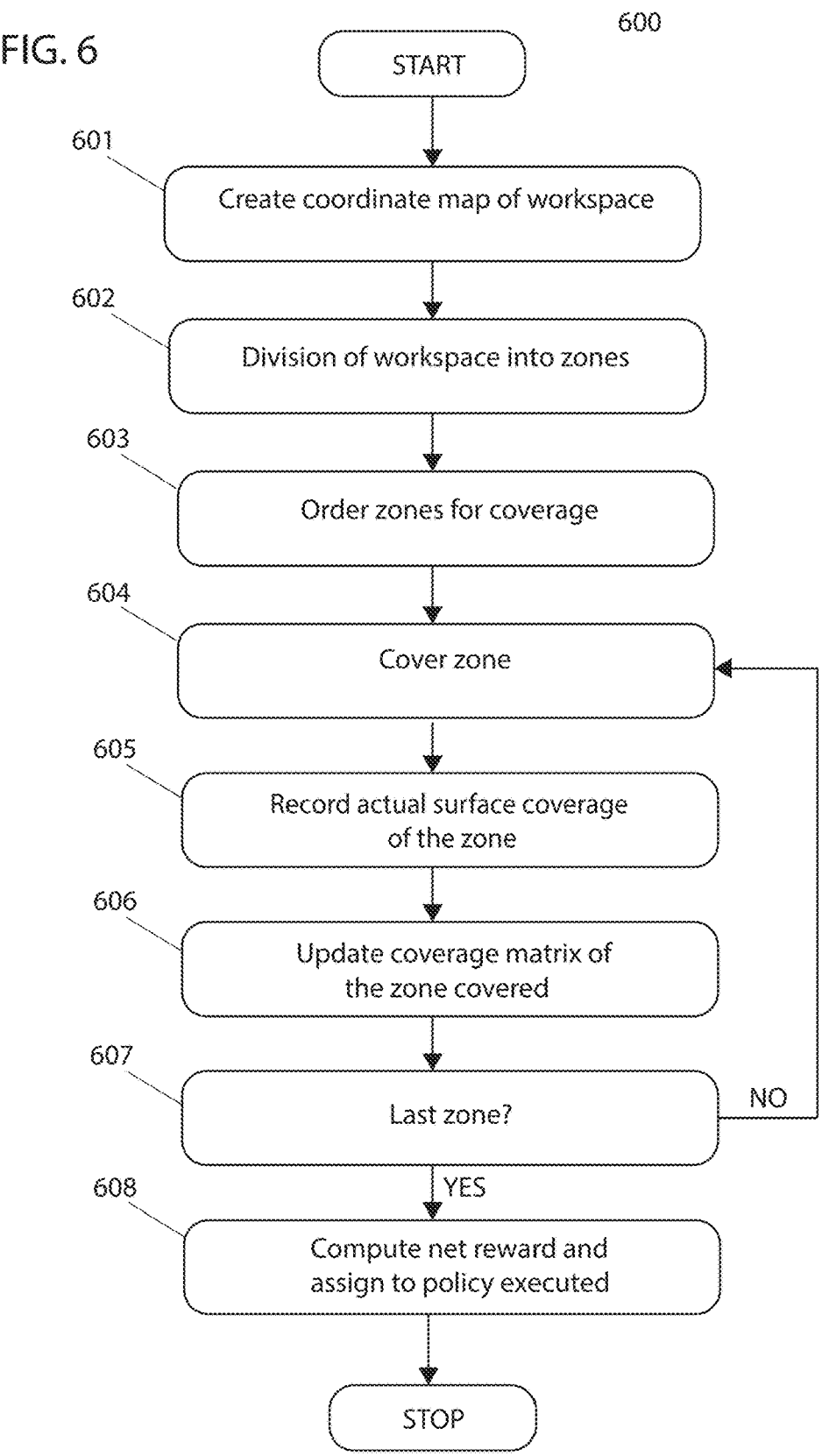

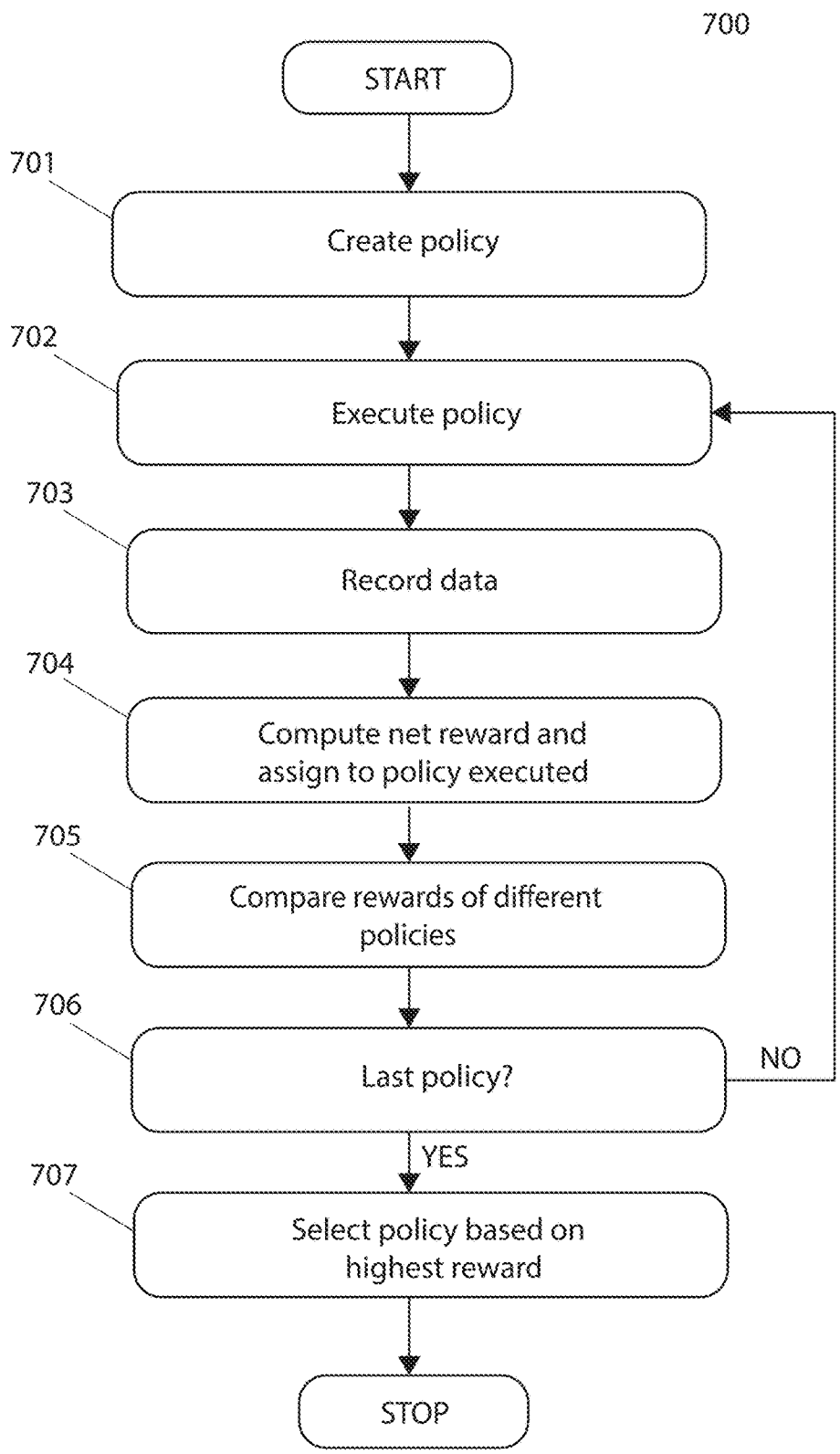

Total Cost: 122

Total Cost: 104

Total Cost: 106

Total Cost: 104

Total Cost: 104

METHODS AND SYSTEMS FOR ROBOTIC SURFACE COVERAGE

CROSS-REFERENCE TO RELATED APPLICATIONS

This application is a continuation-in-part of U.S. patent application Ser. No. 15/619,449, filed Jun. 10, 2017, which is a continuation of U.S. patent application Ser. No. 14/817,952, filed Aug. 4, 2015, which claims the benefit of U.S. provisional patent application 62/092,800, filed Dec. 16, 2014. This application also claims the benefit of U.S. provisional patent applications 62/644,708, filed Mar. 19, 2018, 62/658,705, filed Apr. 17, 2018, 62/666,266, filed May 3, 2018, and 62/590,205, filed on Nov. 22, 2017.

In this patent, certain U.S. patents, U.S. patent applications, or other materials (e.g., articles) have been incorporated by reference. Specifically, U.S. patent application Ser. Nos. 16/048,179, 16/048,185, 16/163,541, 16/163,562, 16/163,508, 62/614,449, 16/051,328, 15/449,660, 62/740,558, 62/618,964, 62/613,005, 62/599,216, 62/573,579, 62/573,598, 62/591,217, 62/573,591, 62/637,185, 62/616,928, Ser. No. 15/614,284, 62/613,005, 62/610,633, Ser. No. 16/185,000, 15/048,827, 15/981,643, 15/986,670, 16/041,286, 15/406,890, 14/673,633, 16/163,530, 62/637,156, Ser. Nos. 15/272,752, and 15/949,708 as well as U.S. Pat. No. 9,764,472, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF INVENTION

The present disclosure generally relates to programmatic techniques to analyze surface coverage of a workspace by a robotic device.

BACKGROUND

It is often difficult for autonomous cleaning robots to ensure full (e.g., above a specified amount, like 95% or 99%) coverage of a workspace, particularly given time, compute, and power constraints imposed by many commercial use cases. Several efforts have been made to address this challenge. During operation, some traditional surface coverage robotic devices cover (e.g., apply some cleaning treatment, like vacuuming or mopping to) the surface of a workspace by moving over the workspace randomly or some devices follow a particular surface coverage pattern. With random surface coverage, the robotic device will likely reach all areas of the workspace, so long as it is operated long enough. However, such approaches are often inefficient and result in uneven cleaning. Furthermore, overlapping of serviced areas is likely to occur with random coverage.

Robotic cleaning devices may also follow a systematic surface coverage pattern. With systematic surface coverage, the robotic device follows a predetermined (e.g., hand-coded without contextual logic) pattern of movement, such as crossing the floor in parallel rows. This approach often provides an even and controlled surface coverage method for the robotic device. However, since systematic paths are predetermined, the structure of the pattern may not be able to adapt to different workspaces and may therefore be too rigid to cover all areas of the workspace without, for example, repeat coverage of areas or increased coverage time.

Additional attempts to improve surface coverage efficiency may involve complex mapping systems requiring expensive technology, including additional sensors, image processors, advanced processors, GPS etc. for monitoring covered surfaces of the workspace to, for example, ensure all areas are reached by the robotic device in a timely manner and avoid repeat coverage of areas. In those instances, acquisition and maintenance costs may be prohibitive. A need exists for a more economical and practical solution to reduce or eliminate surface coverage redundancy and improve surface coverage efficiency of a workspace. As such, methods and systems for surface coverage of a workspace by a robotic device are presented herein. None of the preceding should be read as a disclaimer of subject matter, which is not to suggest than any other discussion of design tradeoffs herein is such a disclaimer.

SUMMARY

The following is a non-exhaustive listing of some aspects of the present techniques. These and other aspects are described in the following disclosure.

Some aspects include a process, including: obtaining, with one or more processors, a map of a workspace, the map quantizing the workspace into a plurality of cells, each cell corresponding to an area of the workspace; segmenting, with one or more processors, the workspace into a plurality of zones, each zone having a subset of the plurality of cells; determining, with the one or more processors, a sequence of the zones among a plurality of candidate sequences based on an effect of the sequence on a cost of a cost function that is based on travel distance of the robot through the sequence; and causing, with the one or more processors, the robot to traverse the zones in the determined sequence.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

Non-limiting and non-exhaustive features of the present invention are described with reference to the following figures, wherein like reference numerals refer to like parts throughout the various figures.

FIG. 5 illustrates examples of net rewards received for different surface coverage policies, acted upon by systems embodying features of the present techniques;

FIG. 6 is a flowchart illustrating an example of a method for optimizing surface coverage of a workspace, acted upon by systems embodying features of the present techniques;

FIG. 7 is a flowchart illustrating an example of a method for optimizing surface coverage of a workspace, embodying features of the present techniques and executed by some embodiments;

DETAILED DESCRIPTION

Figure 1A:
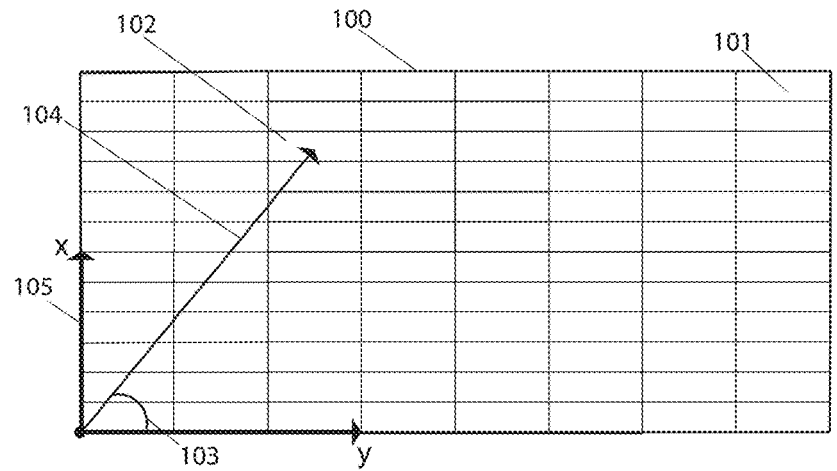
FIGS. 1A and 1B illustrate a coordinate map of a workspace and corresponding workspace matrix, acted upon by systems embodying features of the present techniques.

The present inventions will now be described in detail with reference to a few embodiments thereof as illustrated in the accompanying drawings. In the following description, numerous specific details are set forth in order to provide a thorough understanding of the present invention. It will be apparent, however, to one skilled in the art, that the present inventions may be practiced without some or all of these specific details. In other instances, well known process steps and/or structures have not been described in detail in order to not unnecessarily obscure the present inventions.

Although various methods and techniques are described herein, it should be kept in mind that the present techniques may also be implemented as articles of manufacture that include a computer readable medium (a term which as used herein broadly refers to a single medium storing all instructions or media in use cases where different subsets of instructions are stored on different media) on which computer-readable instructions for carrying out embodiments of the inventive methods or technique are stored. The computer readable medium may include, for example, semiconductor, magnetic, opto-magnetic, optical, or other forms of computer readable medium for storing computer readable code. Further, the inventions may also be embodied as apparatuses. Such apparatus may include circuits, dedicated and/or programmable, to carry out tasks pertaining to embodiments of the invention. Examples of such apparatus may include a specialized computer and/or a dedicated computing device when appropriately programmed and may include a combination of a computer/computing device and dedicated/programmable circuits adapted for the various tasks pertaining to embodiments of the inventions.

In some embodiments, a control system (such as a processor) of a robotic device (which may be on-board, at a docking station, or provided by a remote processor to which the present computational acts are offloaded) may create a map of a workspace comprising a number (e.g., a plurality) of cells for coverage of a workspace by the robotic device. In some embodiments, the map of the workspace may be an ordered list comprising the cells, a matrix comprising the cells as entries, a visual grid map of the cells, or various other types of representation of the cells defining the workspace. In some embodiments, each cell may be defined by an ordered pair wherein a first value represents an angle and a second value represents a distance from an origin of a coordinate system. The map of the workspace may be divided into zones by the control system wherein each zone may be defined by a zone matrix including a portion of the cells of the map as entries. In other instances, each zone may be defined by the control system by an ordered list of its cells, by a visual grid map of its cells, or by any other type of representation of its cells.

In some embodiments, the robotic device may perform a task, such as vacuuming or mopping, on a zone-by-zone basis. The task performed may be the same in each zone or it may be different depending on factors such as the size and shape of the zone or characteristics of the environment. In some embodiments, a user may instruct the robotic device to perform certain tasks in each of the zones and set a schedule for when tasks are performed. Methods for providing user instructions to a robotic device include those described in U.S. patent application Ser. Nos. 15/272,752 and 15/949,708, the entirety of the contents of which are incorporated herein by reference. Methods for setting a schedule of a robotic device include those described in U.S. patent application Ser. Nos. 16/051,328 and 15/449,660, the entirety of the contents of which are incorporated herein by reference. In some embodiments, a user may instruct the robotic device to skip coverage of a zone. In some embodiments, the control system skips coverage of a zone or modifies operations of the robotic device when it recognizes the zone as one previously visited. Methods for instructing a robotic device to skip a zone and recognition of a previously zone and responses thereto include those described in U.S. Patent App. No. 62/740,558, the entirety of the contents of which are incorporated herein by reference.

Initially, values of various variables may be acquired by (e.g., sensed by) the control system and used by the control system to divide the workspace into zones, such as the strength of a wireless signal (such as WI-FI™ or other radio frequency (RF) signal), or the location of doors. For example, a door may be indicated in such signals and cause embodiments of the control system to divide an area into two zones, one on either side of the door. In some embodiments, division of the workspace into zones by the control system may be (partially or entirely) arbitrary or may depend on the layout of the workspace, where, for example, furniture of the workspace may be sensed by embodiments of the control system and cause those embodiments to divide the workspace, or the workspace may be divided into zones based on various other logic.

The zones of the workspace may be ordered by the control system of the robotic device for surface coverage, and the robotic device may be actuated by the control system to cover the surface of each zone in the resulting sequential order. Initially, zones may be ordered, for example, arbitrarily or according to their size or based on the current position of the robotic device and/or the position of the zones relative to one another or by using various other types of measure or logic. The control system of the robotic device may use various devices to record the actual surface covered by the robot for each zone, such as an optical encoder, gyroscope, structure from motion, odometer, or any other device capable of tracking movement of the robotic device to determine which cells of the workspace the robotic device has covered. A coverage matrix of a zone corresponding to the zone matrix may be updated by the control system to indicate actual surface coverage.

For a given zone, in some embodiments, each entry of its coverage matrix corresponds to an entry of its zone matrix and hence a cell of the workspace. When a cell of a workspace is covered by the robotic device, the value of the corresponding entry in the coverage matrix may be updated by the control system to indicate coverage. For example, each time a cell of a zone is covered, the value of the corresponding entry in the coverage matrix of the zone may be increased by one, with all entries beginning with a value of zero to indicate no coverage. (Or values may be decremented by some amount in systems in which reversed signs convey the sematic equivalent to that described herein—a qualification that applies generally to this document, e.g., discussion of maximizing a reward function should be read as indicating the inventors also contemplate minimizing a cost function). In some embodiments, a reward may be computed and assigned to a policy by the control system based on performance of surface coverage of the workspace by the robotic device. In some embodiments, the policy may comprise the zones created, the order in which they were covered, and the coverage path (i.e., it may comprise data describing these things). In some embodiments, the policy may comprise a collection of states and actions experienced by the robotic device during surface coverage of the workspace as a result of the zones created, the order in which they were covered and coverage path. In embodiments, the reward may be based on actual surface coverage, repeat coverage, total coverage time, travel distance between zones etc. In embodiments, the process may be iteratively repeated to determine the policy that maximizes the reward. In some embodiments, coverage of the workspace by the robotic device may continue until the control system determines that each cell of the workspace is covered at least once.

In some embodiments, a control system of a robotic device may create a coordinate map of the workspace comprising a number of cells. In some embodiments, the control system of the robotic device may use distance sensors, LIDAR sensors, LADAR sensors, depth cameras or other types of sensors capable of perceiving the environment to create the map of the workspace. In other embodiments, a map may be preloaded into a memory of the robotic device or may be created by an external component, such as a base station of the robotic device, and the map may be shared with the control system of the robotic device. In some embodiments, the control system of the robotic device may map an environment while performing a task, such as cleaning. In some embodiments, the control system of the robotic device may first create a map prior to performing any tasks and may then improve the map in future runs while performing a task, which in some cases may provide for more efficient mapping. Upon completion of the map, the control system of the robotic device may provide notice to a user. Methods for constructing a map of an environment include those described in U.S. patent application Ser. Nos. 16/048,179, 16/048,185, 16/163,541, 16/163,562, 16/163,508, 62/614,449, 62/618,964, 62/613,005, 62/599,216, 62/573,579, 62/573,598, 62/591,217, 62/573,591, 62/637,185, the entirety of the contents of which are incorporated herein by reference.

Figure 1B:
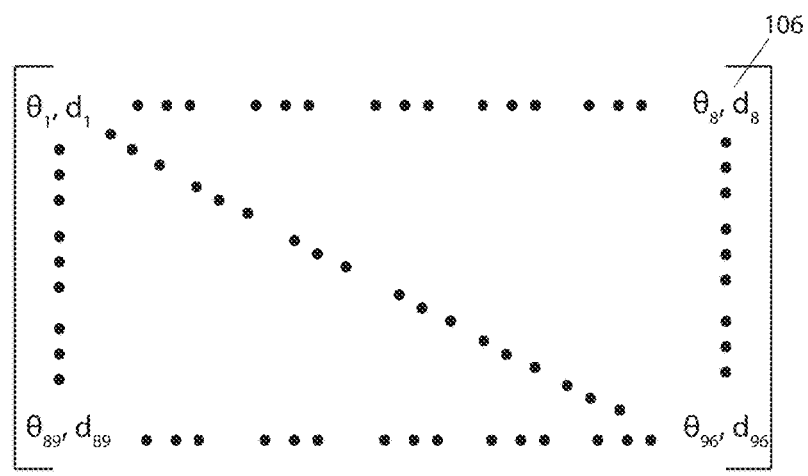

FIG. 1A illustrates a visual representation of coordinate map 100 of a workspace wherein each rectangular division 101 represents a cell of the map. The term "map" as used herein does not require a visual representation and is used more broadly to refer to a data structure that encodes a description of two or higher dimensional spatial attributes of an area. A regular rectangular tiling subdivision is depicted, but other forms are contemplated, such as regular or irregular hexagonal tilings or subdivision by space filing curves, like Hilbert curves or Morton curves. Each cell may be defined by an ordered pair (e.g., a vector with two dimensions) wherein the first value is an angle and the second value is a distance from an origin of a coordinate system (e.g., a polar coordinate). For example, cell 102 may be identified by the control system of the robotic device by an ordered pair comprising angle 103 and distance 104 with respect to coordinate system 105. In some embodiments, the map of the workspace may be represented by (e.g., encoded as), for example, an ordered list or matrix comprising the cells of the workspace as entries. For example, coordinate map 100 of the workspace, comprising 96 cells, may be represented by a workspace matrix. Assuming cells of coordinate map 100 of the workspace are numbered in order beginning with the top left-hand corner cell as cell number one and moving across rows from left to right, a workspace matrix such as that illustrated in FIG. 1B may be used by the control system (e.g., in program state of a process implementing some embodiments) to represent the workspace wherein subscripts represent the cell number. Each entry of the matrix corresponds to a cell of the workspace illustrated in FIG. 1A, and each cell in an entry of the matrix is defined by an angle θ and distance d from an origin of coordinate system 105 by the control system. For example, rectangular division 101 is cell number eight and corresponds to entry 106 of the workspace matrix in FIG. 1B. Any workspace embodiment may therefore be represented by the control system using an N×M matrix with each ordered pair of a cell used as an entry of the matrix. In some cases, cells are arranged in the matrix according to their relative position in the workspace, e.g., the left-most cell of a given row may be in the first column, and the right-most cell may be in a right-most column, or embodiments of the control system may arrange the cells in the matrix without regard to relative position in the area by encoding spatial coordinates in the value of the matrix (e.g., in a four or higher dimensional matrix in which one slice corresponds to the layer depicted).

The control system of the robotic device may divide the workspace into zones based on a variable or factor that the control system of the robotic device determines is most efficient for the working environment or based on a predetermined variable or factor. Zones may include multiple cells, e.g., spatially contiguous sets of multiple cells.

For example, initially the control system may divide the workspace into zones using the strength of a wireless signal, such as WI-FI or other forms of RF. In some instances, initial division of the workspace into zones may depend on the location of doors. For example, a door may indicate a division of an area into two zones, one on either side of the door. An example of a door detection method for a robotic device may be found in U.S. Patent App Nos. 62/616,928, 62/613,005, and Ser. No. 15/614,284, the contents of which are hereby incorporated by reference. In some embodiments, division of the workspace by the control system of the robotic device may be arbitrary or may depend on the layout of the workspace, where, for example, furniture of the workspace may be considered a divider of the workspace, or the workspace may be divided based on various other logic.

Figure 2A:
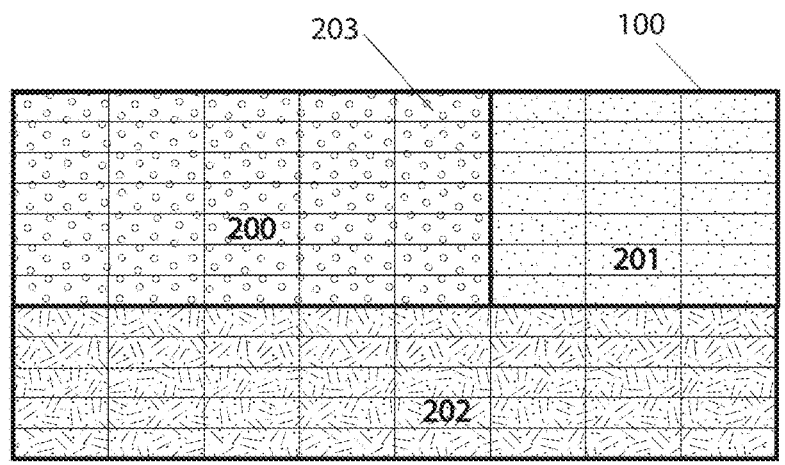
FIGS. 2A-2C illustrate zones of a workspace and corresponding zone and coverage matrices, acted upon by systems embodying features of the present techniques.
Figure 2B:
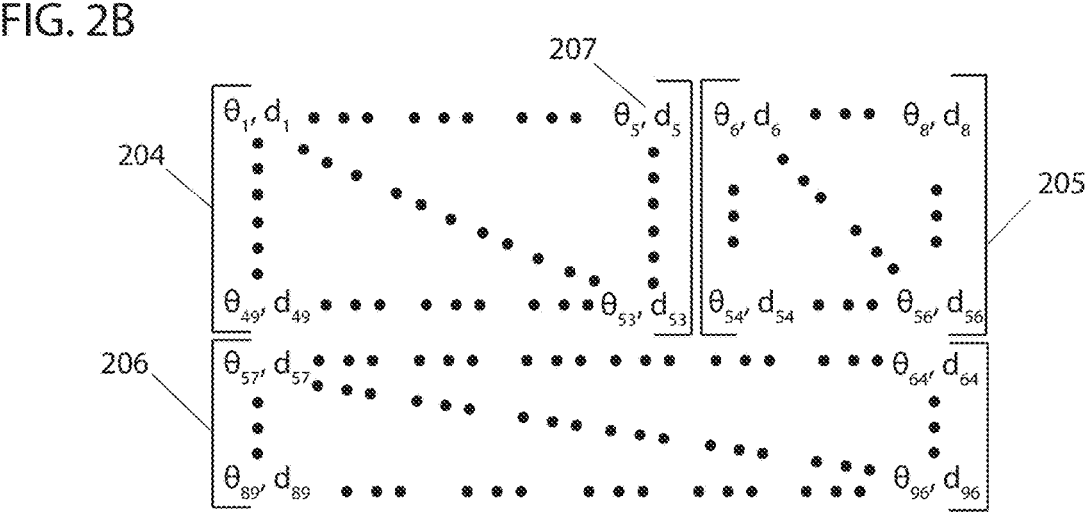

A zone may comprise a portion of the cells constituting the workspace, which may be represented by the control system as a set of entries or using a n×m matrix wherein $n \subseteq N$, $m \subseteq M$, and therefore $n \times m \subseteq N \times M$. For example, FIG. 2A illustrates a visual representation of coordinate map 100 of a workspace divided into rectangular zones 200, 201 and 202 by the control system. Each zone is defined by a spatially contiguous subset of the cells of the workspace. For example, zone 200 is defined by all cells with the same pattern as cell 203 within zone 200. FIG. 2B illustrates zone matrices 204, 205, and 206 corresponding to zones 200, 201, and 202, respectively. Each entry of the zone matrix of a zone corresponds to a cell of the workspace wherein entries of each zone matrix are a portion of the entries of the workspace matrix. For example, all entries of zone matrix 204 correspond to cells with the same pattern as cell 203 within zone 200 and thus comprise the portion of the entries of the workspace matrix of FIG. 1B corresponding to those cells. For example, cell 203 of zone 200 (cell number five of the workspace) corresponds with entry 207 of corresponding zone matrix 204. Together zone matrices 204, 205, and 206 form the workspace matrix illustrated in FIG. 1B. In some instances, the combination of all zones created by the control system of the robotic device may only comprise a portion of the workspace.

The control system of the robotic device, in some embodiments, may order zones 200, 201, and 202 for surface coverage. The initial order of zones by the control system may be arbitrary or may be dependent on the size of the zones or may be dependent on the current position of the robotic device and/or the position of the zones relative to one another or may be chosen based on any other measure or logic. The robotic device may be actuated by the control system to cover, in order, the surface of each zone. In some embodiments, the robot may cover an area at a given position that is less than the size of the zone, e.g., less than the size of a cell, and the robot may cover the zone by moving over a coverage path so that different parts of the zone are covered at different times. The control system of the robotic device may record, for each zone, the actual surface covered, e.g., by integrating an area produced by convolving a shape region cleaned by the robot at a given position with a path of the robot. In embodiments, the expected surface coverage of a zone may be estimated by the control system by determining the approximate area of the zone in the coordinate map. The actual surface coverage may be measured through dead reckoning, odometry, structure from motion, gyroscope or by any other method capable of tracking movement of the robotic device.

In some embodiments, the control system of the robotic device may update, for each zone, a coverage matrix of the zone corresponding to the zone matrix of the zone as (or after, with each iteration of coverage) the robotic device covers the zone surface. In embodiments, each entry of the coverage matrix corresponds to an entry of the zone matrix, positioned in the same row and column. Since each entry in the coverage matrix of a zone corresponds to an entry in the zone matrix of a zone, both matrices have the same dimensions in some embodiments. It should be emphasized that a data structure need not be labeled as a "matrix" in program code to constitute a matrix, and that matrices may be encoded in a variety of formats, including as an array of arrays, as an array of objects in an object oriented programming language, as a table in a relational database, or as entries in a key-value store, provided that the entries preserve the information encoded in a matrix, e.g., ordering of a collection of values in two or more dimensions. When a cell of a zone is covered by the robotic device, the entry of the coverage matrix corresponding to the entry of the zone matrix comprising the cell covered may be updated by the control system of the robotic device. Thus, a current entry may reflect multiple instances in which a zone was covered in the past. In some embodiments, all entries of the coverage matrix of a zone may initially have a value of zero, and an entry in the coverage matrix may be updated by a value of one (e.g., incremented) by the control system each time a cell contained in the corresponding entry of the zone matrix is covered. In some cases, values are updated by the same increment or decrement, or in some cases, values may be updated by amounts that vary, e.g., responsive to a duration of time that the robot spends in the corresponding area. As noted, updating may include incrementing, decrementing, appending, or otherwise modifying an extant value such that information reflecting multiple instances of coverage is reflected in the value after those instances occur. In some cases, the values updated are ordinal, cardinal, or nominal values. In some cases, the values are a single value, or in some cases, the values are a larger data structure, like a list of binary values with a 1 or 0 appended each time the zone is covered depending on whether the corresponding cell was covered.

Figure 2C:
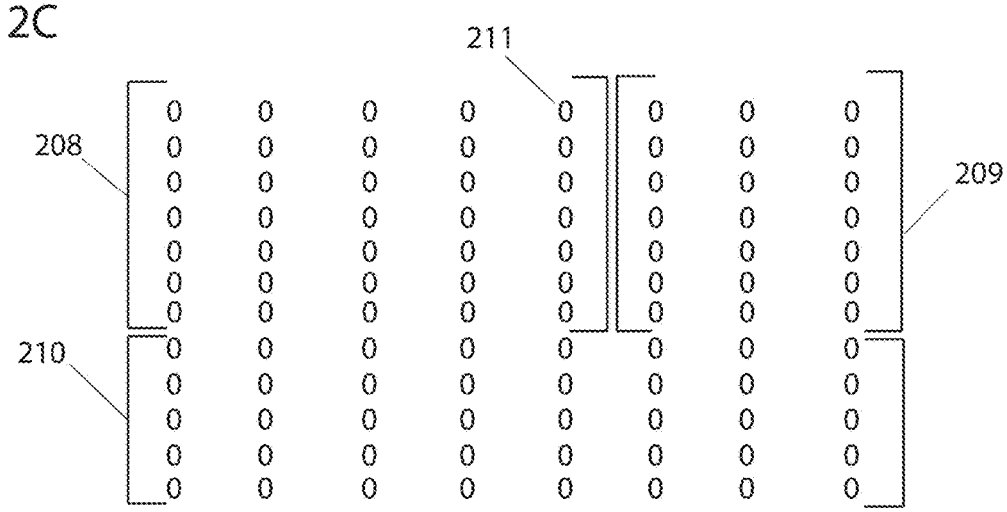

In some embodiments, some entries of the coverage matrix may initially have a specified value that indicates occupancy of the cell if (e.g., in response to embodiments determining that), for example, the corresponding cell of the workspace is occupied by an object, such as a piece of furniture. FIG. 2C illustrates coverage matrices 208, 209, and 210 corresponding to zone matrices 204, 205, and 206, respectively, with each matching pair of matrices having the same dimensions. Since each entry in a zone matrix corresponds to the same entry in a coverage matrix, entry 207 of zone matrix 204 corresponds to entry 211 of coverage matrix 208. Initially all entries have a value of zero to indicate no coverage. However, as the robotic device covers cells in entries of zone matrices 204, 205, and 206, the value of corresponding entries in coverage matrices 208, 209, and 210 are increased by a value of one by the control system each time a corresponding cell is covered. For example, when cell 203 in entry 207 of zone matrix 204 is covered by the robotic device, the value of entry 211 in the same row and column of corresponding coverage matrix 208 is updated by the control system to a value of one to indicate coverage of the cell one time. In embodiments, the entry of the zone matrix corresponding to the entry of the coverage matrix of a zone need not be in the same row and column.

Figure 3A:
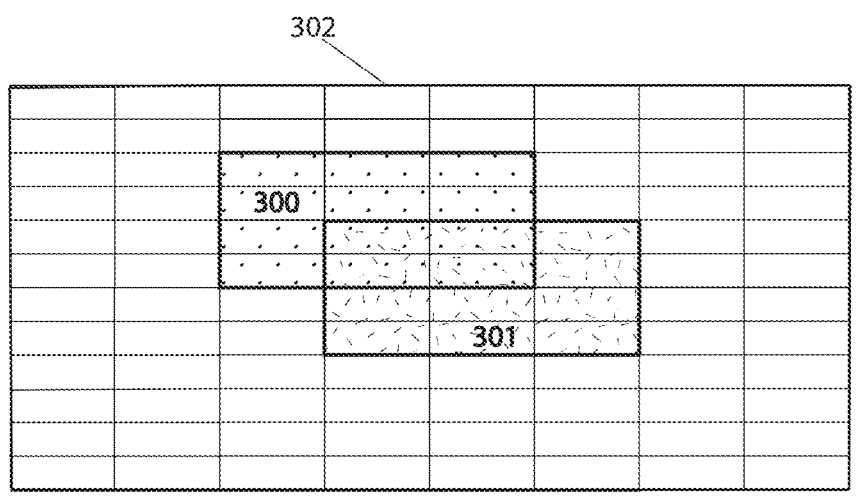
FIGS. 3A-3D illustrate zones of a workspace and corresponding zone and coverage matrices, acted upon by systems embodying features of the present techniques.
Figure 3B:
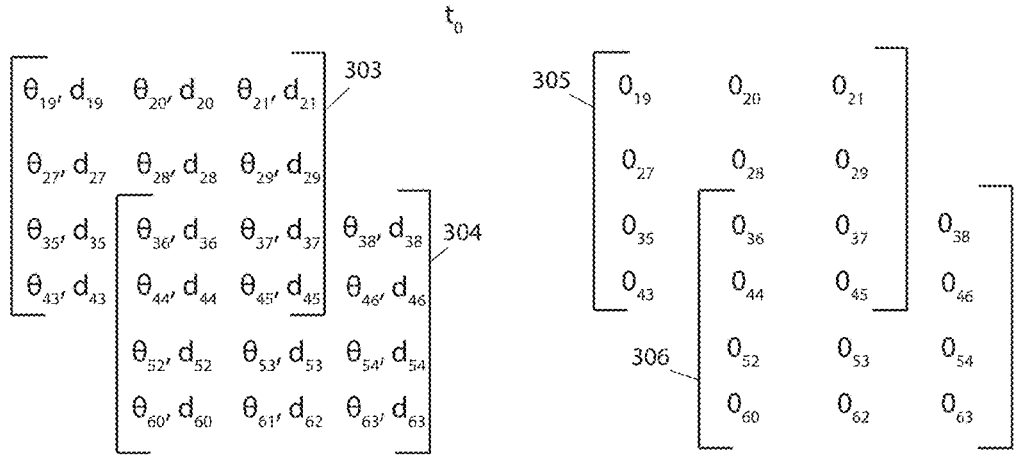
Figure 3C:
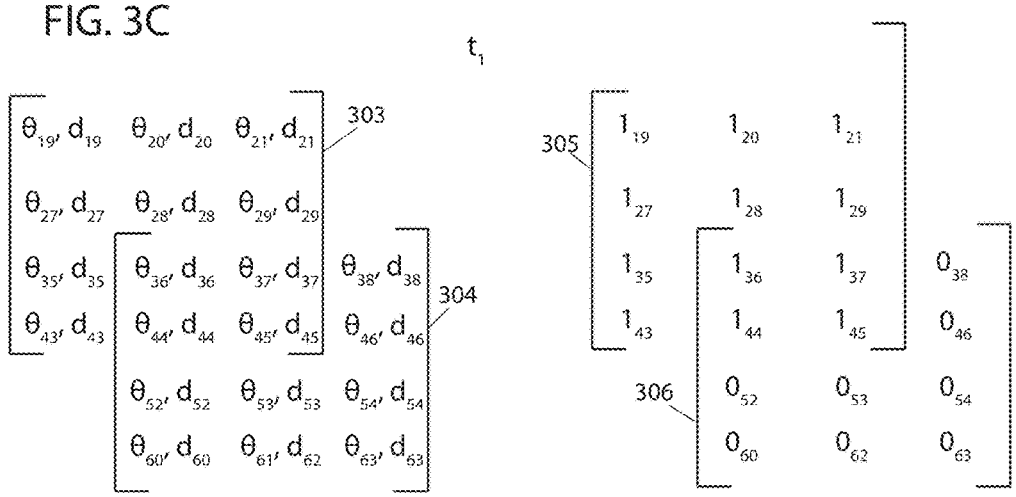
Figure 3D:
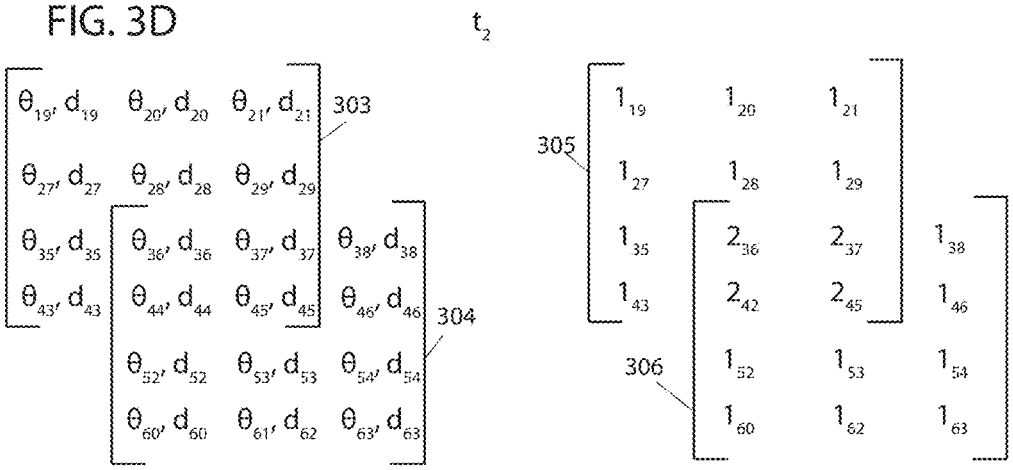

As a further example, FIG. 3A illustrates zones 300 and 301 of workspace coordinate map 302 processed by a robotic device. In the illustrated labeling schema, cells of coordinate map 302 of the workspace are numbered in order beginning with the top left-hand corner cell as cell number one and rastering across rows from left to right, top to bottom. Zone matrices 303 and 304 illustrated in FIG. 3B may be created and used by a control system of the robotic device to represent zones 300 and 301 of the workspace, wherein subscripts represent the cell number. Since some cells of zones 300 and 301 overlap, corresponding entries of zone matrices 303 and 304 of those cells overlap as well. FIG. 3B also illustrates corresponding coverage matrices 305 of zone 300 and 306 of zone 301. Coverage matrices are of the same dimension as corresponding zone matrices as each entry of the zone matrix has a corresponding entry in the coverage matrix of a zone. Each entry in the zone matrix of a zone represents a cell within the coordinate map of the workspace and each corresponding entry in the coverage matrix represents the number of times the corresponding cell has been covered. Initially at time $t_0$, all entries in both coverage matrices 305 and 306 are zero as no cells of zones 300 and 301 have been covered. Once a cell within a zone is covered by the robotic device, the control system of the robotic device may identify the cell as covered and update the value of the corresponding entry in the coverage matrix by a value of one, indicating coverage of that cell one time. As the robotic device covers the cells of zone 300, entries in coverage matrix 304 corresponding to entries in zone matrix 303 comprising the cells of the zone are updated by the control system, each entry in coverage matrix 305 being increased by a value of one (or some other increment) each time the cell contained in the corresponding entry of zone matrix 303 is covered. After complete coverage of zone 300 at a time $t_1$, in some embodiments, all entries of coverage matrix 305 have a value of one as illustrated in FIG. 3B, assuming each cell of zone 300 was covered one time. Since zone 301 overlaps with zone 300, a portion of the cells of zone 301 were covered during surface coverage of zone 300. As such, a portion of entries of coverage matrix 306 corresponding to cells of zone 301 overlapping with zone 300 have a value of one although zone 301 has yet to be covered. After surface coverage of zone 300, the robotic device moves on to cover the surface of zone 301 overlapping zone 300. Assuming zone 301 is completely covered at a time $t_2$ wherein each cell of zone 301 is covered once, coverage matrices 305 and 306 are updated by the control system as shown in FIG. 3C. Repeat coverage in the overlapping areas between zones 300 and 301 is reflected in coverage matrices 305 and 306, as entries in coverage matrices 305 and 306 corresponding to overlapping cells between zones 300 and 301 have a value of two, indicating that coverage of those particular cells occurred twice. In practice, the first zone covered yields an ideal coverage matrix, assuming all cells of the zone are covered once, as overlap between zones has not yet occurred as there is only one zone that has yet been covered at that point. However, as time goes on, overlap between zones becomes increasingly likely resulting in repeat coverage of cells. This is undesirable as repeat coverage is redundant and, thus, reduces coverage efficiency. Methods for eliminating or reducing such redundancies are discussed further below. In certain instances, repeat coverage of some cells may be desired when, for example, certain areas of the workspace require thorough cleaning by a robotic device.

In some embodiments, a work session of a robotic device may be determined by embodiments to be complete when all (or greater than a threshold amount) of the values of the coverage matrices representing zones of the workspace are nonzero. In some instances, a work session may be determined to be complete when a percentage of cells of the workspace are covered or when certain preselected cells have been covered. In response to the determination, cleaning of the current zone may be ceased, and the robot may move to a next zone in the ordered list of zones. In some cases, values of the matrices are reset to an initial value (e.g., of zero) each time the zone is cleaned, or the values may be resent less often, e.g., only once at initialization, weekly, yearly, every 10 sessions, or the like.

In some embodiments, the control system of the robotic device may compute a reward (e.g., an aggregate score, like an ordinal or cardinal value) based on surface coverage of the workspace and may assign the reward to a policy. In some embodiments, the policy may comprise (e.g., by having a copy of, or the same instance as discussed above of) the zones created (e.g. size, shape, location), the order in which they were covered and coverage path. In some embodiments, the policy may comprise a collection of states and actions (or stimuli) experienced (e.g., sensed) by the robotic device during surface coverage (e.g., associated with a location being covered) of the workspace as a result of the zones created, the order in which they were covered and coverage path.

In embodiments, the reward may be computed by embodiments based on actual surface coverage, repeat coverage, total coverage time, travel distance between zones etc., such as weighted combinations thereof. For example, a policy resulting in actual surface coverage equal to the expected surface coverage of the workspace may be assigned a greater reward by the control system of the robotic device than a policy resulting in an actual surface coverage that was only half of the expected surface coverage of the workspace. For instance, some embodiments may multiply each value greater than 1 by −1 and, then, compute a measure of central tendency (e.g., a mean, mode, or median) of a coverage matrix as a reward score. As a further example, a policy resulting in repeat coverage of many cells of the workspace may be assigned a smaller reward by the control system than a policy resulting in minimal repeat coverage of cells. In instances where travel distance between sequentially ordered zones is considered by the control system in computing the reward, the reward computed may be dependent on the difference between the actual distance traveled by the robotic device to move between sequential zones and the shortest possible distance between zones as calculated by the control system of the robotic device using the coordinate map of the workspace. Algorithms such as A* algorithm may be used by the control system to find the shortest path from a point A in one zone to a point B in another zone to minimize redundancy. In embodiments, the total work session time may also be considered by the control system of the robotic device in determining the reward wherein coverage of the workspace in less time may result in a greater reward. In embodiments, several factors such as those described above may be considered collectively in determining the reward. Some factors may have greater weight in determining the value of the reward. In some cases, the reward function is an objective function that embodiments optimize by adjusting the policies, e.g., with a greedy optimization that adjusts the zones or their sequence.

In embodiments, the method of surface coverage by a robotic device described herein may be iteratively repeated with adjustments to the policy at each iteration to determine the policy that maximizes (e.g., locally or globally) the reward and thereby minimizes redundancy of surface coverage (assuming that is the dominant metric in the objective function). A variety of techniques may be used to determine the adjustments. Some embodiments may model the environment with a differentiable function and execute a gradient descent on the objective function as applied to the model. In many cases, such a model is non-differentiable or not available, in which cases, some embodiments may apply other techniques to optimize the policy. For instance, some embodiments may execute a Baysean optimization or other form of derivative-free optimization that does not require a differentiable function, like genetic algorithms, random search, or simulated annealing. In some cases, optimization may be offloaded (by conveying the policies and coverage matrices) to a remote cloud-based computing system, which may return optimized or improved policies.

Figure 4A:
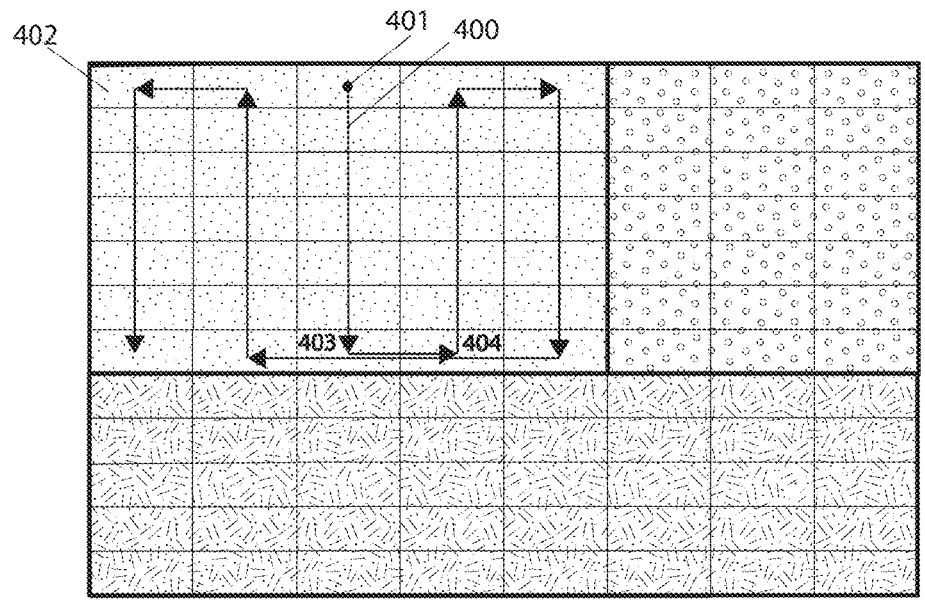
FIGS. 4A and 4B illustrate examples of redundancies that may occur during surface coverage of a workspace.
Figure 4B:
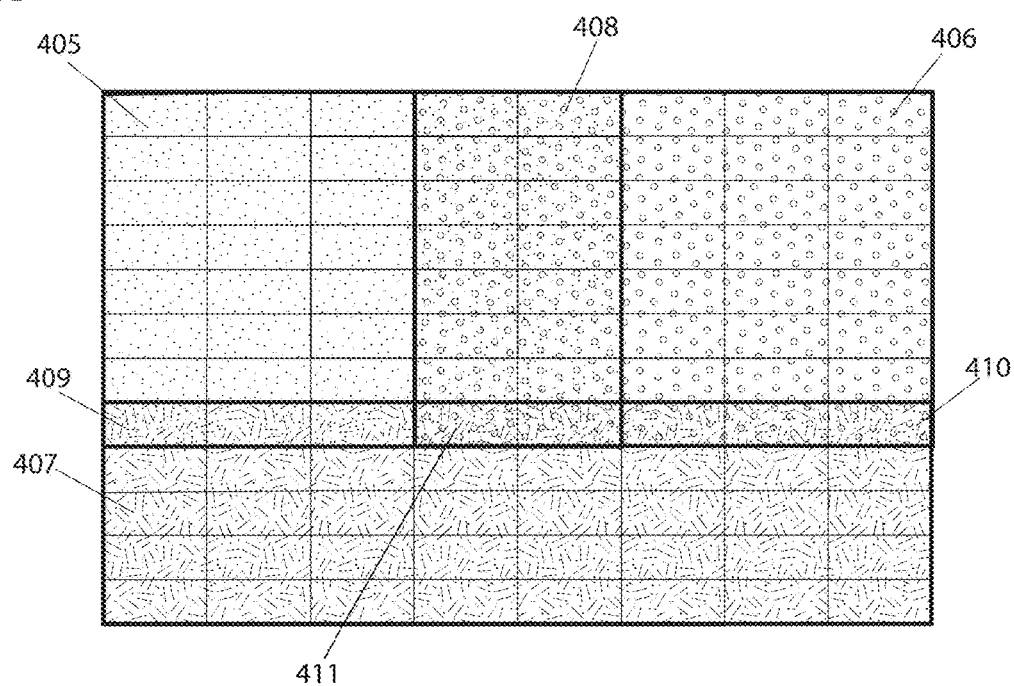

During operation, several types of redundancy may occur during surface coverage of a workspace by a robotic device. In some cases, coverage paths are determined that, within a zone, raster from one side to another, circle from a perimeter inward, or a combination thereof. For example, during surface coverage of a zone, the coverage path of the robotic device may overlap. FIG. 4A illustrates this embodiment, wherein coverage path 400 of a robotic device beginning at point 401 of zone 402 is shown. Overlap of the coverage path occurs at cells 403 and 404. This overlap results in redundancy as unnecessary repeat coverage of cells 403 and 404 of the workspace occurs due to overlapping of coverage path 400. Redundancy may also be encountered due to overlap between zones resulting in repeat coverage of cells within the overlapping area of the overlapping zones. FIG. 4B illustrates overlapping zones 405, 406, and 407. Cells within overlapping area 408 of overlapping zones 405 and 406 may be redundantly covered twice, once during coverage of zone 405 and again during coverage of zone 406. Similarly, cells within overlapping area 409 of overlapping zones 405 and 407 and overlapping area 410 of overlapping zones 406 and 407 may be covered twice. Cells within overlapping area 411 of overlapping zones 405, 406, and 407 may be covered three times, once during coverage of zone 406 and twice more during coverage of zones 406 and 407. Redundancy during surface coverage of a workspace may also occur when the robotic device is traveling between sequentially ordered zones for surface coverage wherein for example, the robotic device executes a travel path between two zones that is significantly longer than the shortest path between the zones.

Accordingly, in some embodiments, the control system of the robotic device may optimize surface coverage of a workspace by finding (e.g., searching within a parameter space of alternatives with various strategies described herein) the policy that maximizes the reward, e.g., using a Markov Decision Process (MDP) that includes states (e.g., which cell or zone is being processed), actions (e.g., which cell or zone to transition to next), and rewards. During operation, in some embodiments, the robotic device executes a chosen coverage path covering the surface of chosen zones in a chosen sequential order (e.g., as reflected in a current iteration of a policy), during which the robotic device may be considered to be constantly (or periodically or intermittently) transitioning from one state to another by the execution of actions, wherein movement from one state to the next is defined by a discrete time slot. This may be represented by a Markov chain consisting of a sequence of random variables $s_1, s_2, s_3, \ldots$ . The random variables are states the robotic device may experience and form a set S called the state space. The coverage of cells in a particular order may therefore be thought of as a sequence of states $s \in S$, where states are cells visited, each state with a discrete time stamp $t \in T$. For the robotic device to transition from a current state s to a next state s', the robotic device performs an action $a \in A$ over a time span of t to t', moving from one cell to another.

For a Markov chain, having the Markov property, the probability of moving to a next state may be dependent on the present state (or some embodiments may operate on higher order Markov chains, like $2^{nd}$ or $3^{rd}$ order Markov chains). This is mathematically represented by P(s'|s). A Markov chain may be further extended to a MDP through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P(s'|s), the immediate reward after transitioning from state s to state s' given by r, and the discount factor $\gamma$, representing the difference in importance between future and present rewards. The goal of MDP is to find an optimal policy $\pi$ that specifies the highest rewarded action a to take for each state s. In some embodiments, the control system of the robotic device using a MDP, after completing each action and transitioning to a new state, assigns a reward and iteratively calculates a state-action value function as the expected value of the current reward plus the discounted maximum future reward at the next state. The state-action value function provides the value of a state. The control system of the robotic device does not require any visualization in choosing the next action of the robotic device. In some embodiments, the control system optimizes the state-action value function. In optimizing the state-action value function (which may be based on the above objective function, like the reward function above), the highest rewarded actions from each state are simultaneously (or concurrently, in the course of a given decision) identified by the control system and used in deriving the optimal policy. In one embodiment, the value of the reward may be dependent on achieving the desired surface coverage of a workspace. For example, transitioning to a cell which has already been covered may result in incurring a greater negative reward from the control system than transitioning to a cell which has not been covered yet. Assigned rewards during the work session are negative. Other optimization factors may also be considered in computing the reward, such as actual surface coverage, repeat coverage, total coverage time, travel distance between zones etc.

In some embodiments, once the robotic device completes the work session, a predetermined (or dynamically determined) positive reward value is assigned by the control system of the robotic device. A net reward value for the executed surface coverage of the workspace, consisting of a sequence of states and actions experienced, in some embodiments, is then calculated by the control system as (or based on, e.g., in a normalized value) the sum of the cumulative negative reward from the multiple actions taken while transitioning from one state to another and the positive reward upon completion of the work session.

Over time (e.g., over multiple cleaning sessions), optimal state-action value function and optimal policy from which actions from different states are selected may be found by the control system of the robotic device. For a single state, there may be several actions which can be executed. The sequence of states and actions that result in the maximum net reward provides the optimal state-action value function for a given state. In some embodiments, the action for a given state that results in maximum reward provides the optimal policy for the given state. Some embodiments may independently optimize path through a zone and zone configuration/sequence, or some embodiments may globally optimize these aspects. An optimal policy for a state space may then contain the highest valued actions corresponding to multiple states. As different zones, order of coverage of the zones, and coverage paths are executed over time, the number of states experienced, actions taken from each state, and transitions increase. In some embodiments, the surface coverage plan devised by the control system of the robotic device iteratively evolves to become more efficient by choosing transitions that result in most favorable outcomes and by avoiding situations which previously resulted in low net reward. After convergence (which some embodiments may determine has occurred based on changes in net reward between iterations indicating a local or global maximum), assuming the system did not fall into a local minimum or is able to get out of a local minimum by employing techniques such as stochastic perturbations and momentum methods (e.g., randomly changing parameters or changing parameters with a stride that varies), the evolved surface coverage plan of the workspace may be trusted to be more efficient than alternate surface coverage plans that may be devised.

In order to get out of local maximum, the control system of the robotic device, in some embodiments, employs stochastic optimization. Some embodiments may perform multiple optimizations from different randomly selected starting conditions and, then, select the parameters corresponding to the best result of each of the optimizations. This is expected to provide a reliable and efficient method for the control system of the robotic device to devise coverage of a workspace as actions are evaluated and optimized such that the most efficient surface coverage of a workspace is eventually executed and factors reducing surface coverage efficiency, including but not limited to (which is not to suggest other descriptions are limiting), actual surface coverage, repeat coverage, driving distance between zones and total coverage time are reduced with the fine-tuning of properties over time.

An example of a MDP consisting of a sequence of states and actions followed by rewards may be mathematically represented below. Actions are taken to transition from one state to another and after transitioning to each new state a reward is assigned, in some embodiments. For a sequence of states and actions, in some embodiments, the net reward is the sum of rewards received for the sequence of states and actions, with future rewards discounted. MDP may be used to maximize rewards. MDP may be solved using Q-Learning which focuses on the expected net reward for the execution of a sequence of states and actions calculated by a state-action value function (or Q-function). Optimal state-action value function may be identified by a sequence of states and actions with highest net reward. Since multiple actions can be taken from each state, in some embodiments, the goal is to also find an optimal policy, which contains the action from each state with highest reward value. For example, in some embodiments, a sequence of states s and actions a followed by rewards r may be used by the control system to represent states and actions of the robotic device and rewards received and may be notated by:

$$s_t, a_t, r_{t+1}, s_{t+1}, a_{t+1}, r_{t+2}, s_{t+2}, a_{t+2}, r_{t+3}, \ldots a_T, r_T, s_T$$

wherein t is a time step.

The net return $R_T$ to be expected in the future is the sum of the rewards received for the sequence of states and actions beginning from state $s_t$ and ending with terminal state $s_T$. This may be calculated by the control system of the robotic device using:

$$R_T = r_{t+1} + \gamma^1 r_{t+2} + \ldots + \gamma^{T-t-1} r_T$$

where $0 \leq \gamma < 1$ is a discount factor applied as distant rewards are less important. It may be desirable to find the sequence of states and actions that maximize the reward. Q-Learning may be used by the control system of the robotic device to maximize the reward by finding an optimal state-action value function Q (s, a). The value of a state-action pair Q (s, a) may be calculated by the control system and is defined as equivalent to the expected return $R_T$ for the sequence of states and actions beginning with state $s_t$ and action $a_t$ and ending with terminal state $s_T$.

$$Q(s,a) = E[R_T | s_t = s, a_t = a]$$

Over time the control system may find the sequence of states and actions which maximize the state-action value function Q (s, a) and hence the optimal value function Q* (s, a):

$$Q^*(s,a) = \max E[R_T | s_t = s, a_t = a]$$

The optimal policy for each state may be derived by the control system of the robotic device by identifying the highest valued action which can be taken from each state.

$$\pi^*(s) = \operatorname{argmax} Q^*(s,a)$$

In some embodiments, the control system of the robotic device may iteratively calculate the state-action value function for a given state s and action a by applying the Bellman Optimality equation. The optimal value function obeys Bellman Optimality equation and may be expressed as below.

$$Q^*(s,a) = E[r + \gamma \max Q^*(s',a')]$$

The equation expresses that the value for a given state s and action a should represent the current reward r observed at state s plus the maximum discounted future reward for the next state s' the robotic device would end up in. This equation may be used by the control system, in some embodiments, to iteratively calculate the state-action value for a given state s and action a as the sequence of states and actions are executed. i is the iteration number and begins at i=0, with $Q_0(s', a')$ being initially assumed based, for example, on previous experience, the midpoint of the min and max value possible, or an arbitrary value.

$$Q^*_{i+1}(s,a) = E[r + \gamma \max Q_i(s',a')]$$

Based on the definition of an expected value, the equation is equivalent to:

$$Q_{i+1}(s,a) = \Sigma P(s'|s)[r + \gamma \max Q_i(s',a')]$$

where P(s'|s) is the probability that action a will lead to state s', as previously described above. The sequence of states and actions may correspond to the states the robotic device visits and actions it takes while covering the workspace from start to finish, where actions are taken to transition from one cell of the workspace to another. Over time, as the robotic device visits more states and the control system evaluates different actions from each state, the system will converge to find the most optimal action to take from each state, thereby forming an optimal policy.

In some embodiments, the control system of the robotic device may apply the MDP described to optimize coverage of each zone separately and/or may apply the MDP to optimize coverage of the entire workspace. For example, the MDP may be applied to each zone separately to determine the most efficient coverage path of each zone or the MDP may be applied to the entire workspace to determine best division of zones, the order in which they are covered, and the coverage path.

FIG. 5 illustrates an example of different surface coverage plans executed by a robotic device and the corresponding net reward received from a control system of the robotic device. In this particular example, the net reward received is compared for surface coverage plans employing different zone division methods and different order in which zones are serviced. Table 500 includes session column 501, zone division method column 502, order of zones serviced column 503, and net reward column 504. In other embodiments, coverage path or pattern within each zone may also be used by the control system in determining the net reward. The net reward received may be dependent on, for example, travel distance between zones, actual surface coverage, repeat coverage and total coverage time. After servicing a workspace a number of times, in some embodiments, the data may be used by the control system to determine which combination of zones and order of surface coverage produces the highest reward. In some embodiments, a reward function (or other objective function, like a cost function being minimized) may be defined and maximized by the control system to determine the division of zones and/or the order in which zones are covered and/or the coverage path that results in the most efficient surface coverage plan of a workspace. These different aspects may be optimized globally, or greedily, on a parameter-by-parameter basis.

FIG. 6 is a flowchart of a process 600 that, in some embodiments, directs surface coverage of a workspace by a robotic device. At a first step 601, a control system of the robotic device (e.g., on-board or remote) creates a map of the workspace comprising a number (e.g, a plurality, like more than 5 or more than 10) of cells. Each cell within the coordinate map may be defined by an ordered pair by the control system, wherein the first value of a given pair represents an angle and the second of the given pair value represents a distance from an origin of a coordinate system.

At a next step 602, in some embodiments, the control system divides the workspace into a number (e.g., a plurality, like more than 5 or more than 10) of zones each defined by the control system by a zone matrix comprising a portion of the cells of the map. Division of the workspace into zones may be implemented with various approaches.

In some embodiments, division may be based on criteria that may include without limitation (which is not to suggest other lists are limiting): the size of the zone, the location of the zone, the shape of the zone, etc. Initially, the workspace may be divided by the control system based on the strength of a wireless signal, such as a WI-FI or other RF signal. For example, a workspace with three rooms may have different WI-FI signal strength in each room, therefore embodiments may sense signal strength and cluster cells into zones based on signal strength, e.g., three different zones may initially be created based on the three different signal strengths observed by a WI-FI module of the robotic device in the three rooms of the workspace. Some embodiment may apply computer vision techniques to the signal strengths in each cell to define zones with, e.g., edge detection algorithms or blob detection algorithms. In some embodiments, initial division of the workspace may be based on sensed locations of doors. For example, a signal indicative of a door may cause embodiments to divide an area into two zones, one on either side of the door. Methods for detecting a door include those described in U.S. Patent App. Nos. 62/616,928, 62/613,005 and Ser. No. 15/614,284, the entirety of the contents of which are incorporated herein by reference. In some embodiments, division of the workspace may be arbitrary or may depend on the layout of the workspace, where for example furniture of the workspace may cause embodiments of the control system to divide the workspace, or the workspace may be divided based on any other logic.

At a next step 603, in some embodiments, the control system of the robotic device orders (e.g., sequences) the zones for surface coverage. The initial order of the zones may be arbitrary or may be dependent on the size of the zones or may be based on the current position of the robotic device and/or the position of the zones relative to one another or may be chosen based on various other measures or logic.

At a next step 604, in some embodiments, the robotic device covers a zone. The zones may be covered in sequential order (e.g., in response to the sequence) as determined in step 603.

At a next step 605, in some embodiments, the control system of the robotic device records actual surface coverage of the zone by methods such as dead reckoning, odometry, or structure from motion measured using devices such as an optical encoder or gyroscope.

At a next step 606, in some embodiments, the control system of the robotic device updates a coverage matrix of the zone. Each entry of the coverage matrix corresponds to an entry of the zone matrix, the entry being a cell of the workspace. When (e.g., in response to an event in which) a cell within an entry of the zone matrix is covered, the corresponding entry in the coverage matrix may be updated by the control system, for instance, increasing by a value of one each time the particular cell is covered. Various methods for covering a zone may be used in embodiments without limitation (which is not to imply other descriptions are limiting).

At a next step 607, in some embodiments, the control system of the robotic device determines whether the last zone has been covered. If (e.g., if and only if) the control system determines at a step 607 that the last zone has not been covered, the control system continues to a step 604 and actuates the robotic device to cover the surface of the next zone in the ordered list. If the control system determines at a step 607 that the last zone has been covered, the control system of the robotic device proceeds to step 608 to compute a net reward and assign it to the executed policy. The net reward may be dependent on actual surface coverage of the workspace, travel distance between zones, repeat coverage, total coverage time etc. In embodiments, the policy may comprise experienced states and actions of the robotic device during surface coverage of the workspace as a result of the zones created, the order in which they were covered and coverage path. In embodiments, the policy may comprise the zones created, the order in which they were covered and coverage path. In embodiments, only zones created and the order in which they were covered are considered in the policy. It may be desirable for the control system to find the policy that maximizes the reward and thus (according to some objective functions) the surface coverage plan that minimizes redundancy during coverage of a workspace by a robotic device. For example, it may be desirable for the control system to find the policy with the division of zones, order of zones for surface coverage, and coverage path (i.e. the policy) that results in maximum surface coverage of the workspace, smallest travel distances between zones, minimal repeat coverage, and minimal total coverage time (translating to a large reward, e.g., with a reward function that determines a weighted combination of these aspects).

FIG. 7 is a flowchart of a process 700 that in some embodiments determines surface coverage of a workspace by a robotic device. At a step 701, in some embodiments, a control system of the robotic device creates a policy. For example, a created policy may comprise created zones (e.g. location, size, shape, etc.), the order of surface coverage of the zones and coverage path. In a MDP, a created policy may comprise a collection of states and actions of the robotic device corresponding to coverage of the created zones, the order of surface coverage of the zones, and coverage path within and between zones.

At a step 702, in some embodiments, the control system actuates the robotic device and executes the policy. In executing the policy, the control system of the robotic device may iteratively follow steps 603 to 608 as illustrated and disclosed above in FIG. 6. While a policy is executed, in some embodiments, the control system records data at a step 703 and after execution of the policy a net reward may be calculated and assigned to the policy by the control system of the robotic device at a step 704.

At a next step 705, in some embodiments, the control system compares rewards of different policies.

At a next step 706, in some embodiments, the control system of the robotic device determines whether the last policy has been executed. If the control system determines at a step 706 that the last policy has not been executed, in some embodiments, the control system continues to a step 702 to execute another policy. If the control system of the robotic device determines at a step 706 that the last policy has been executed, in some embodiments, the control system continues to a step 707 to select a policy based on the highest reward. In this manner, by iteratively selecting or creating policies and rewarding those policies based on performance of surface coverage of a workspace by a robotic device, surface coverage redundancy may be reduced. In some embodiments, the control system of the robotic device may not continue to step 702 to execute another policy which has not yet been executed.

In some embodiments, a control system of a robotic device may determine an optimal (e.g., locally or globally) surface coverage plan of a workspace by minimizing a cost function or by maximizing a reward function. The control system of the robotic device may divide a workspace A into n zones $A_1, A_2, \ldots, A_n \subset A$ wherein the index indicates the order of surface coverage of the zones. For example, the robotic device may first provide surface coverage to zone $A_1$, followed by surface coverage to zone $A_2$, and so on. In some embodiments, zones $A_1, A_2, \ldots, A_n$ may overlap. For example, there may be indices i and j, for which i≠j and $A_i \cap A_j \neq 0$. In some embodiments, zones $A_1, A_2, \ldots, A_n$ may not collectively represent the entire area of workspace A, wherein the condition $\cup_i A_i = A$ may not be fulfilled. In some embodiments, the overall cost function C of a zone or a workspace may be calculated by the control system of a robotic device based on a travel and cleaning cost K and coverage L. In some embodiments, other factors may be inputs to the cost function. For example, $$C = \omega_1 K - \omega_2 L$$

may be used by the control system of a robotic device to calculate cost of surface coverage, wherein weights $\omega_1, \omega_2 \geq 0$ may be used to adjust importance of travel cost and surface coverage. The objective of the control system may be to minimize the travel and cleaning cost K and maximize coverage L. The travel and cleaning cost K may be determined by the control system by computing individual cleaning cost for each zone and adding the required driving cost between zones. The driving cost between zones may depend on where the robot ended surface coverage in one zone, and where it begins surface coverage in a following zone. A cleaning cost function F for a zone $A_i$ may be specified, such that given zone $A_i$ and starting position $g_i$ of the robotic device, the control system may compute cleaning cost $h_i$ and final position $f_i$ of the robotic device:

$$h_i, f_i = F(A_i, g_i)$$

The cleaning cost $h_i$ may be dependent on factors such as the movement pattern of the robotic device, coverage time, etc. Upon completion of surface coverage of zone $A_i$, the control system may actuate the robotic device to move towards the closest position $g_{i+1}$ within the next zone $A_{i+1}$ to be covered.

$$g_{i+1} = \underset{g \in A_{i+1}}{\operatorname{argmin}} D(f_i, g)$$

The function $D(f_i, g)$ may be used by the control system to compute distance from final position $f_i$ to every possible position $g \in A_{i+1}$. A travel cost function T for driving from final position $f_i$ of zone $A_i$ to starting position $g_{i+1}$ of zone $A_{i+1}$ may be specified, such that given final position $f_i$ and starting position $g_{i+1}$, the control system may compute travel cost $p_{i+1}$:

$$p_{i+1} = T(f_i, g_{i+1})$$

Therefore, the travel and cleaning cost $K_i$ for a zone $A_i$ may be computed by the control system of the robotic device as shown below:

$$K_i = h_i + p_i$$

And, the total travel and cleaning cost for all zones $A_1, A_2, \ldots, A_n$ of workspace A may be computed by the control system as below:

$$K = \sum_{i=1}^{n} K_i = \sum_{i=1}^{n} h_i + p_i$$

Coverage cost for a workspace may be defined and computed by the control system as:

$$L = \left\| \bigcup_i A_i \right\|$$

wherein the norm may refer to the square meters of area covered by the robotic device.

Figure 8A:
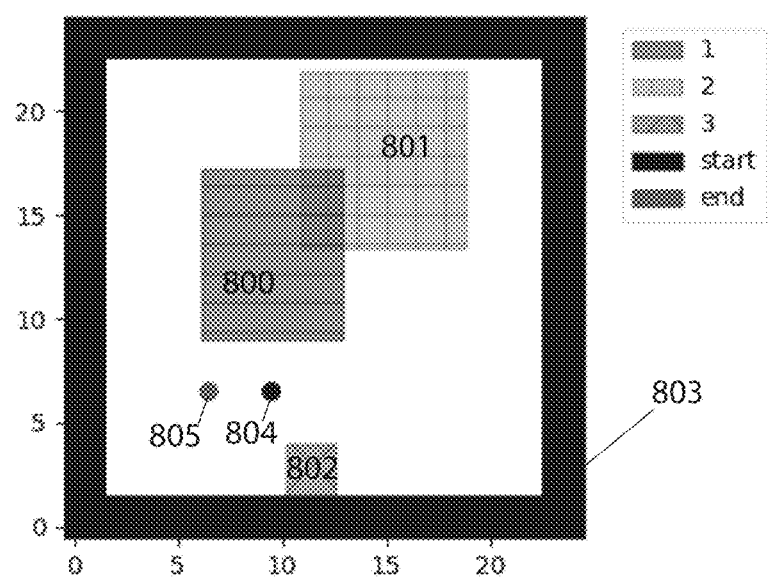
FIGS. 8A-8C illustrate embodiments of a method for optimizing surface coverage of a continuous space with rectangular zones, embodying features of the present techniques and executed by some embodiments.
Figure 8B:
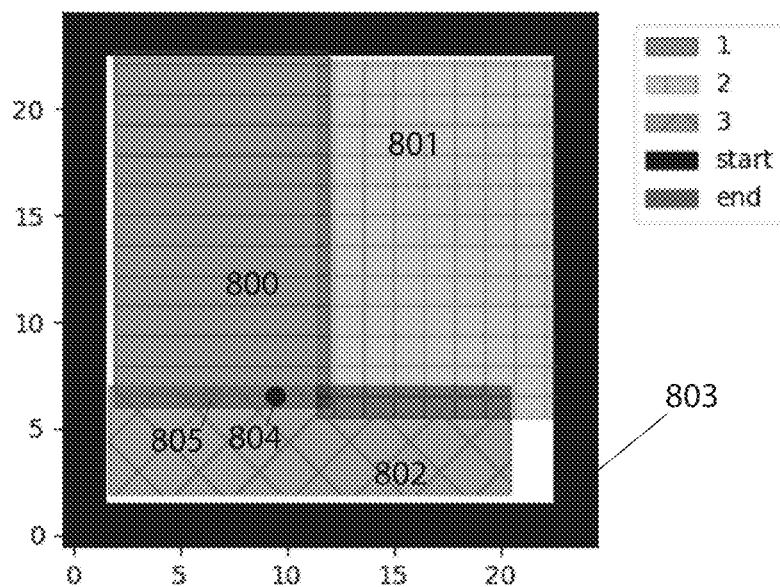
Figure 8C:
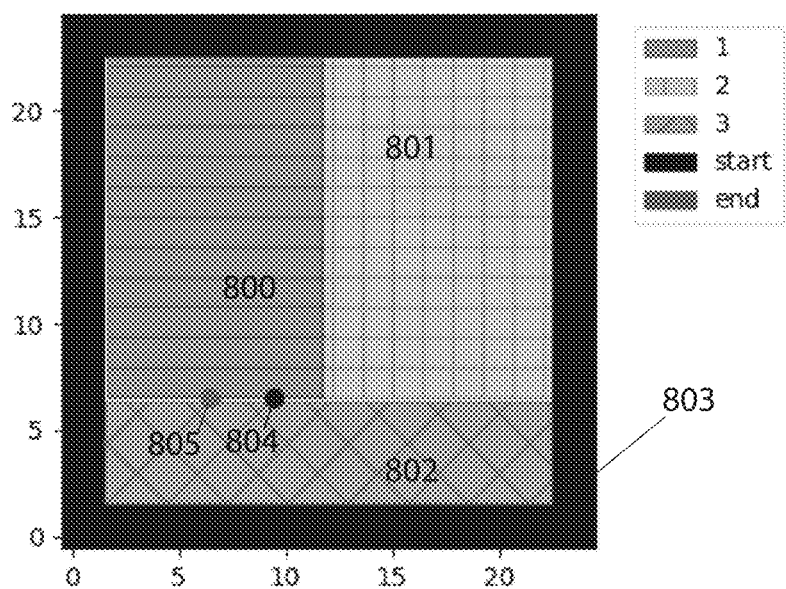

In some embodiments, the control system of a robotic device may minimize the total cost function $C = \omega_1 K - \omega_2 L$ by modifying zones of workspace A by, for example, removing, adding, shrinking, expanding, moving and switching the order of coverage of zones. For example, in some embodiments the control system of the robotic device may restrict zones to having rectangular shape, allow the robotic device to enter or leave a zone at any surface point and permit overlap between rectangular zones to determine optimal zones of a workspace. In embodiments, additional conditions may be included or excluded by the control system. Since a rectangle may be defined by x, y coordinates of its center, its width and its height, zones of a workspace may be defined by the control system using an n×4 array of floating point numbers. Rectangular zones may initially be created and ordered for surface coverage by the control system of the robotic device. Gradient descent may then be used by the control system to compute the division of zones (i.e. size, location) that results in minimal cost, as defined by the cost function C, by iteratively modifying division of zones based on a partial derivative of the cost function with respect to each respective parameter defining the zones. The control system may employ gradient descent for a zone $A_i$ by computing:

$$A_i = A_i - h \frac{\partial C}{\partial A_i}$$

wherein h is the step size of the gradient descent. Derivatives of the cost function C may be computed by the control system with respect to each of the four variables defining the rectangle by using, in some embodiments, a finite difference approximation. FIGS. 8A-8C illustrate an implementation of gradient descent. In FIG. 8A rectangular zones 800, 801 and 802 of workspace 803 are shown. Units along the x- and y-axis may be feet or other unit of measurement. A robotic device begins at point 804 then sequentially covers the surface of zones 800, 801, and 802 and ends at point 805. The initial coverage is not ideal. To improve coverage, gradient descent may be applied by a control system of the robotic device. Since the cost function is based on coverage, the zones may be expanded by embodiments in the direction of uncovered areas and avoid overlap. For instance, embodiments may determine partial derivative of the cost function with respect to parameters of the zones that indicate such an adjustment will tend to reduce the cost locally. To lower traveling cost, the proximity of zones with respect to other zones to be covered immediately before and after is increased (i.e. distance between sequentially ordered zones is reduced) by the control system.

FIGS. 8B and 8C illustrate the steps in an iterative process of gradient descent and optimization of surface coverage by the control system of a robotic device. Some embodiments may iteratively adjust until a stopping condition is reached, e.g., until there is less than a threshold amount of change between sequential iterations in cost. FIG. 8B illustrates expansion of rectangular zones 800, 801, and 802 to improve coverage while FIG. 8C illustrates further optimization of coverage and traveling cost by the control system such that there is no overlap between zones 800, 801, and 802 and the border of each zone is adjacent to the border of those zones to be covered immediately before and after. In some embodiments, the control system of a robotic device may use various functions to further improve optimization of surface coverage of the workspace.

Figure 9A:
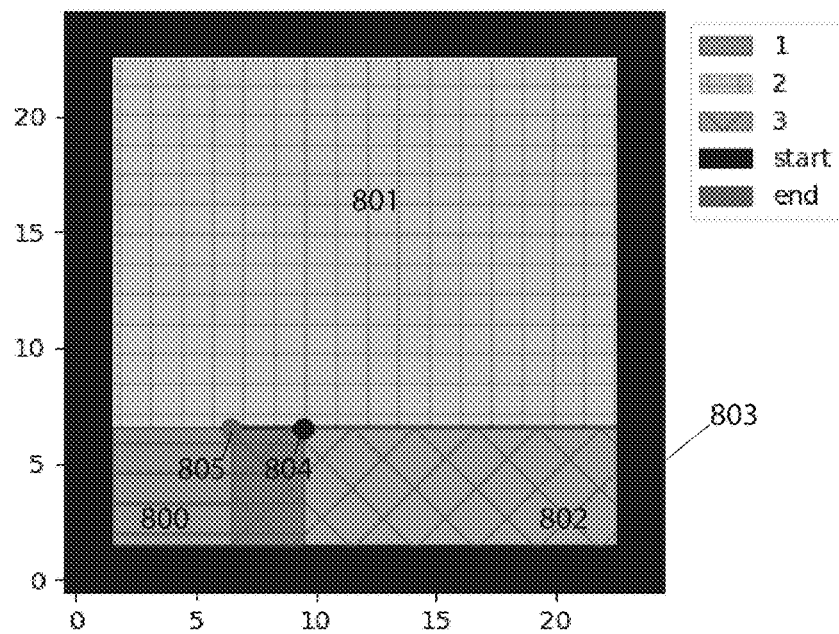
FIGS. 9A and 9B illustrate an example of deadlock encountered during optimizing surface coverage of a workspace.
Figure 9B:
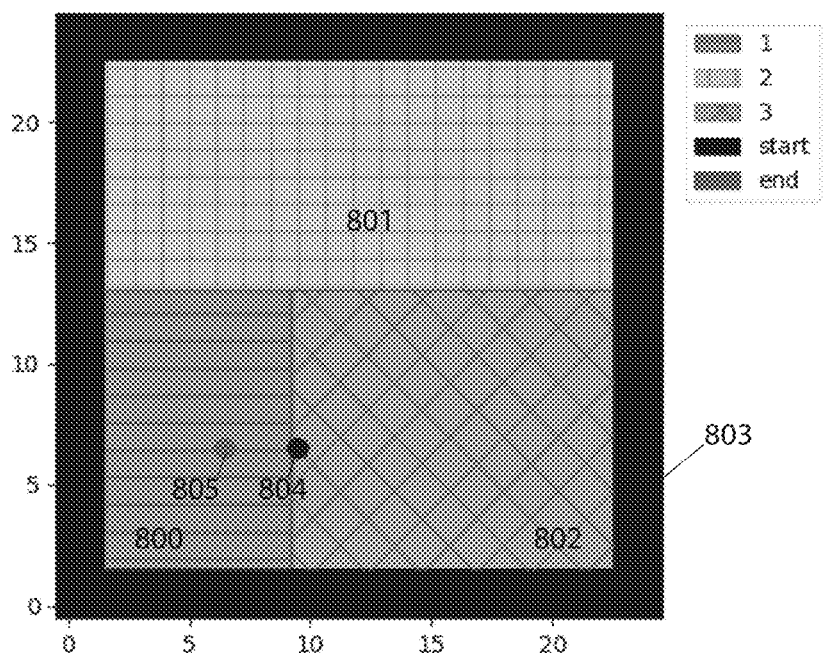

These functions may include, a discover function wherein a new small zone may be added to large and uncovered areas, a delete function wherein any zone with size below a certain threshold may be deleted, a step size control function wherein decay of step size in gradient descent may be controlled, a pessimism function wherein any zone with individual cleaning cost below a certain threshold may be deleted, and a fast grow function wherein any space adjacent to a zone that is predominantly unclaimed by any other zone may be quickly incorporated into the zone. In some embodiments, deadlocking may occur when, for example, stuck in local maximum or minimum or when driving distance measure fails to account for walls. Some embodiments may implement stochastic gradient descent to reduce the effects of local minima or maxima. Another example of deadlock is illustrated in FIG. 9A between zones 800 and 802 as they are both competing for the same area with the same priority. Zone 800 desires expansion towards starting point 804 as coverage begins in zone 800 and zone 803 desires expansions towards ending point 805 as coverage ends in zone 803. Such a situation may be avoided by beginning coverage in zone 803 and ending in zone 800. Alternatively, the weights in the cost function for coverage and travel and cleaning cost may be adjusted. For example, if more weight is given to travel and cleaning cost, zones 800, 801 and 803 may be as illustrated in FIG. 9B wherein overlap between zones 801 and 803 is observed as traveling distance between zones results in larger penalty than overlap between zones.

In some embodiments, the cost function minimized by the control system may account for additional features other than or in addition to travel and cleaning cost and coverage. Examples of features that may be inputs to the cost function may include, coverage, size, and area of the zone, zone overlap with walls, location of zones, overlap between zones, location of zones and shared boundaries between zones. In some embodiments, a hierarchy may be used by the control system to prioritize importance of features (e.g., different weights may be mapped to such features in a differentiable weighted, normalized sum). For example, tier one of a hierarchy may be location of the zones such that traveling distance between sequential zones is minimized and boundaries of sequential zones are shared, tier two may be to avoid walls, tier three may be to avoid overlap with other zones and tier four may be to increase coverage.

In some embodiments, the cost function may be integrated with MDP wherein the control system of the robotic device finds the division of zones, order of surface coverage of zones, coverage path, etc. that minimize the cost function, thereby maximizing the reward.

In some embodiments, a workspace of a robotic device is represented by a control system of the robotic device using a coordinate map comprising a collection of cells, and zones may have the form of any connected component on the coordinate map. In such embodiments, the coordinate map of the workspace may be represented by the control system using a matrix wherein each entry corresponds to a coordinate cell of the workspace and zones may be represented by the control system using a matrix corresponding to a portion of the coordinate cells of the workspace. In some embodiments, each cell of the workspace can only belong to a single zone, overlap between zones is avoided by construction. Entries in the matrices of zones may have a value of zero if the corresponding cell of the workspace is empty or may have a value of one if the cell is occupied by, for example, a wall or furniture. Zones may initially be created and ordered for surface coverage by the control system of the robotic device. In some embodiments, to optimize division of zones of a workspace, the control system of a robotic device may proceed through the following iteration for each zone of a sequence of zones, beginning with the first zone: expansion of the zone if neighbor cells are empty, movement of the robotic device to a point in the zone closest to the current position of the robotic device, addition of a new zone coinciding with the travel path of the robotic device from its current position to a point in the zone closest to the robotic device if the length of travel from its current position is significant, execution of a surface coverage pattern (e.g. boustrophedon) within the zone, and removal of any uncovered cells from the zone. In some embodiments, additional steps may be included in the iteration or certain steps described may be omitted, which is not to suggest that any other process herein is not also amenable to such variation.

Figure 10A:
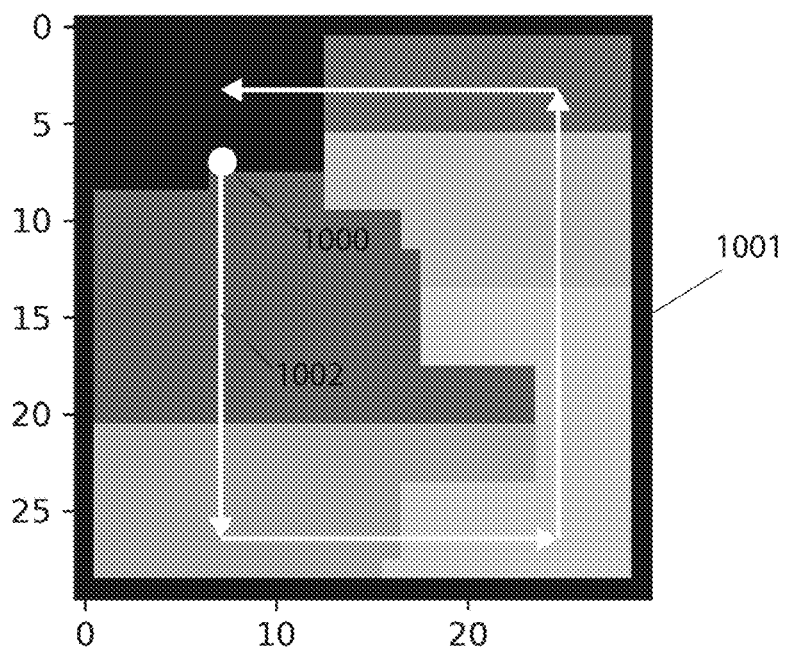
FIGS. 10A and 10B illustrate patterns followed by embodiments implementing a method for optimizing surface coverage of a discrete space with rectangular zone, in accordance with some embodiments.
Figure 10B:
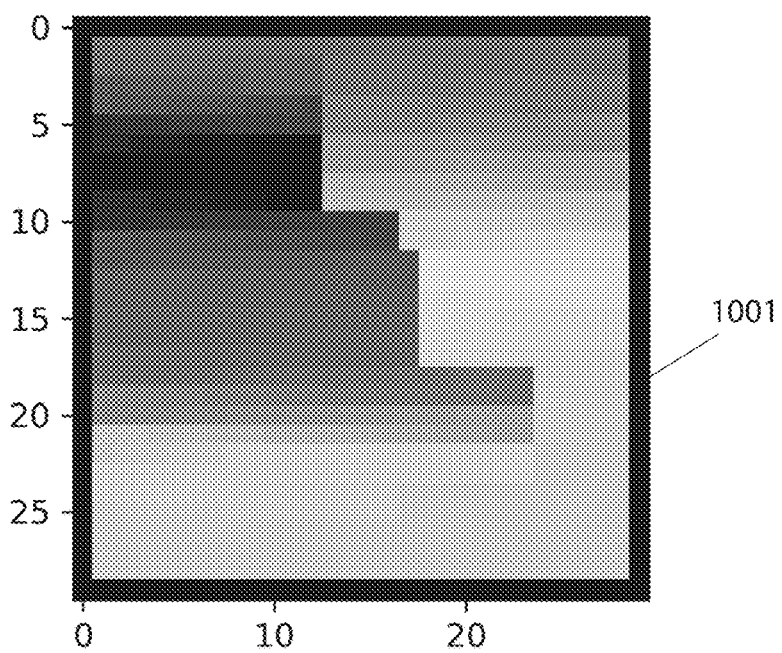

In some embodiments, additional functionalities may be used by the control system such as, placement of a new zone in any large, uncovered areas to increase discovery speed, deletion of areas with size below a certain threshold and aggressive growth of efficient zones wherein efficiency may be measured by for example, coverage time or coverage path. FIG. 10A illustrates zone segmentation resulting from execution of some examples of the iteration described herein with coverage beginning and ending at point 1000 of workspace 1001. Order of surface coverage is shown by arrow 1002. FIG. 10B illustrates the boustrophedon pattern executed for surface coverage of workspace 1001 represented by the back and forth striations within each zone and leading from one zone into another.

Figure 11A:
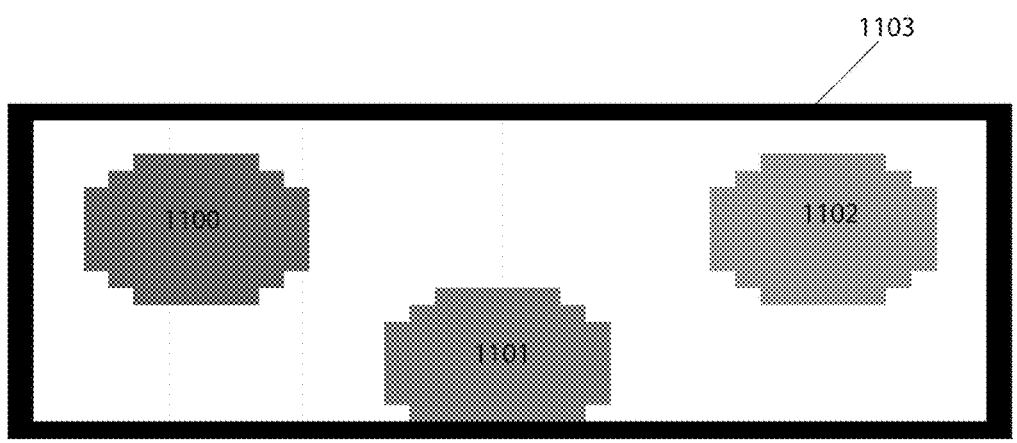
FIGS. 11A and 11B illustrate patterns followed by embodiments implementing a method for optimizing surface coverage of a discrete space with arbitrarily shaped zones, in accordance with some embodiments.
Figure 11B:
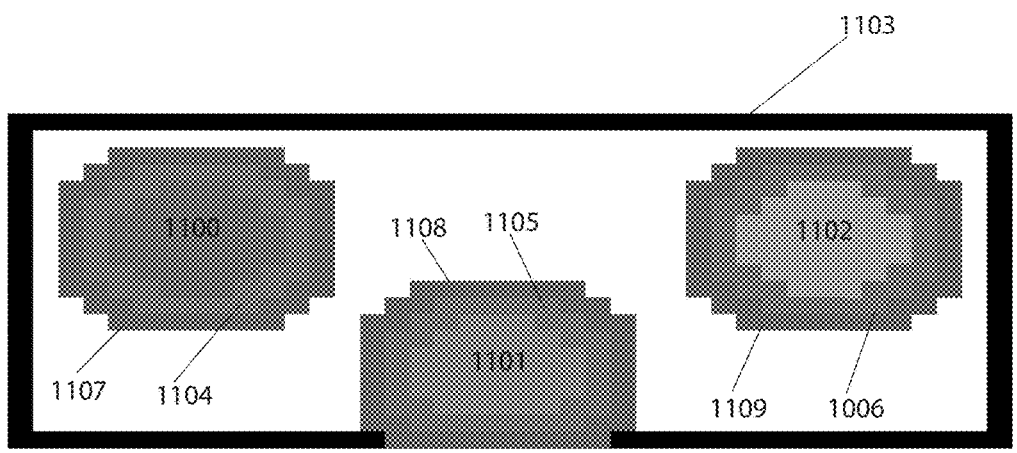

In some embodiments, optimal division of zones of a workspace of a robotic device may be determined by a control system of the robotic device by modeling zones as emulsions of liquid, such as bubbles. For instance, some embodiments may determine a Euclidean Steiner tree with Steiner vertices that define zone corners and correspond to obstacles. In some embodiments, the control system of the robotic device may create zones of arbitrary shape but of similar size, avoid overlap of zones with wall structures of the workspace and minimize surface area and travel distance between zones. Behaviors of emulsions of liquid, such as minimization of surface tension and surface area and expansion and contraction of the emulsion driven by an internal pressure may be used in modeling the zones of the workspace. To do so, in some embodiments, the workspace of the robotic device may be represented on a grid map and divided into zones by the control system of the robotic device. The grid map may be converted by the control system into a routing graph G consisting of nodes N connected by edges E. A zone A may therefore be represented by the control system using a set of nodes of the routing graph wherein $A \subset N$. The nodes may be connected and represent an area on the grid map. A zone A may be assigned a set of boundary edges E by the control system of the robotic device wherein a boundary edge $e=(n_1, n_2)$ connects a node $n_1 \in A$ with a node $n_2 \notin A$. Thus, the set of boundary edges clearly defines the set of boundary nodes $\partial A$, and gives information about the nodes, which are just inside zone A as well as the nodes just outside zone A. Boundary nodes in zone A may be denoted by $\partial A^{in}$ and boundary nodes outside zone A by $\partial A^{out}$. The collection of $\partial A^{in}$ and $\partial A^{out}$ together are all the nodes in $\partial A^{out}$. FIG. 11A illustrates zones 1100, 1101, and 1102 and wall 1103 of a workspace. FIG. 11B illustrates zones 1100, 1101, and 1102 with $\partial A^{in}$ boundary nodes 1104, 1105, and 1106 and $\partial A^{out}$ boundary nodes 1107, 1108, and 1109, respectively. In embodiments, a control system of a robotic device may expand a zone A in size by adding nodes from $\partial A^{out}$ to zone A and may reduce the zone in size by removing nodes in $\partial A^{in}$ from zone A, allowing for fluid contraction and expansion.

Figure 12A:
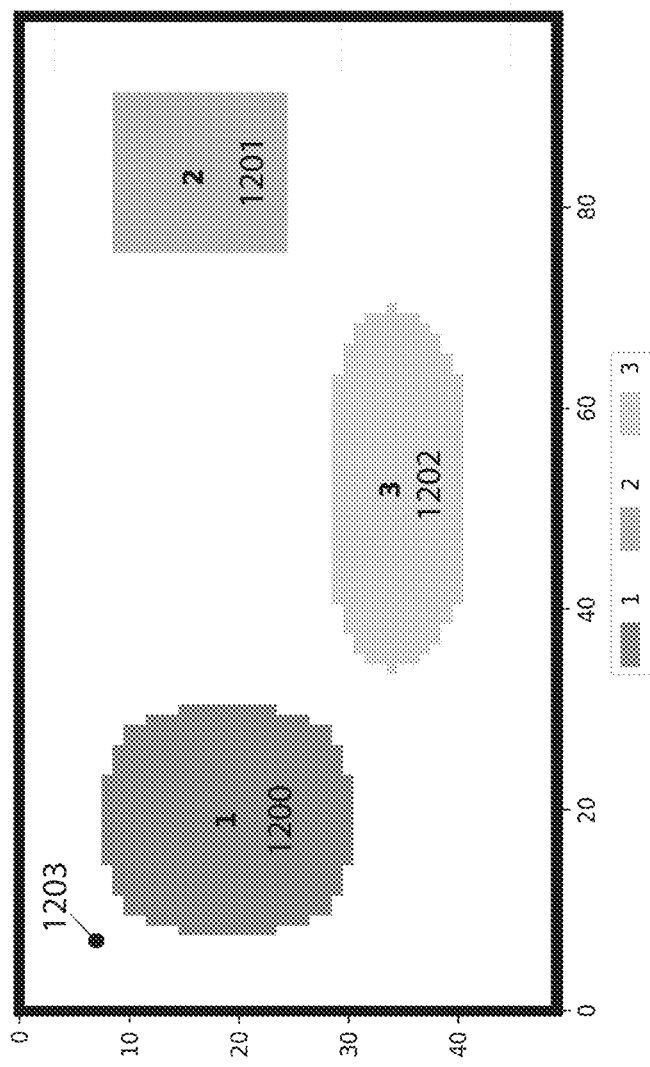
FIGS. 12A-12C illustrate example measures of area and distance from the center of a zone used in assigning a numerical value to boundary nodes of a zone, in accordance with some embodiments.
Figure 12B:
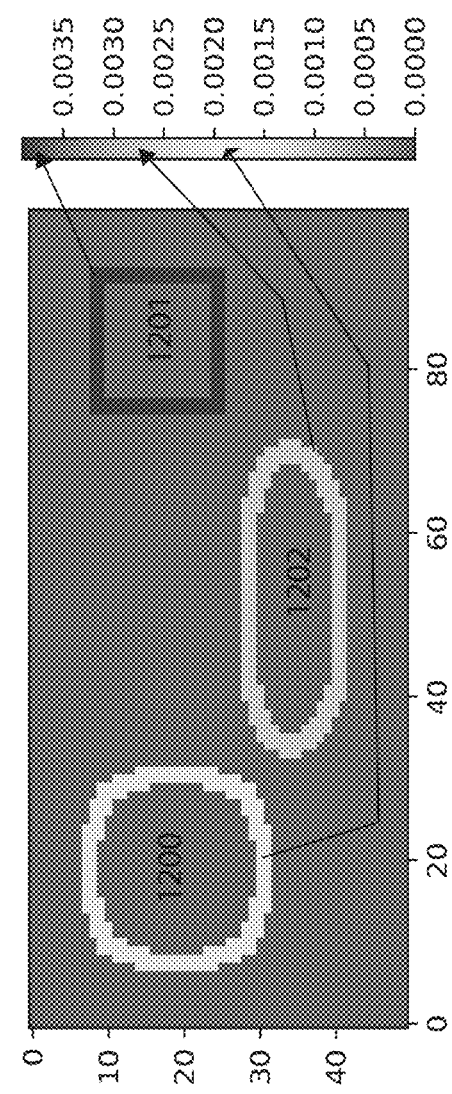

In some embodiments, a numerical value may be computed and assigned to each node in $\partial A$ by the control system of the robotic device, wherein the value of each node indicates whether to add or remove the node from zone A. The control system may, for example, compute a numerical value for each node in $\partial A$ for each zone $A_1, A_2, \ldots, A_n$, of a workspace. Depending on the value of each node in $\partial A$, each node is either removed from zone A, added to zone A or moved to another zone by the control system. In some embodiments, the numerical value computed may be dependent on growth (if the area is small) and decay (if the area is large) of the zone, distance of the node from the center of the zone, order of zone coverage, and a surface smoother score. For example, for a boundary node of a zone, growth and decay of the zone and distance of the node from the center of the zone may be evaluated by the control system of the robotic device using:

$$\frac{c_1}{a} + \frac{c_2}{d^2}$$

wherein a is area of the zone, d is the distance of the node from the center of the zone and $c_1, c_2$ are constants which dictate the importance of each term in the equation. FIG. 12A illustrates zones 1200, 1201, and 1202 with same start and end point 1203. In FIG. 12B values for $$\frac{1}{a}$$

are shown for boundary nodes of zones 1200, 1201, and 1202.

$$\frac{1}{a}$$

for each boundary node within the same zone is equal in value as indicated by the consistent color of boundary nodes in each zone. Arrows indicate approximate value of boundary nodes for each zone. In comparing boundary nodes from different zones, boundary nodes belonging to smaller zones result in a greater value for $$\frac{1}{a}$$

as indicated by the color of boundary nodes of different zones. Smaller areas with greater value for $$\frac{1}{a}$$

may indicate desired growth of the zone.

Figure 12C:
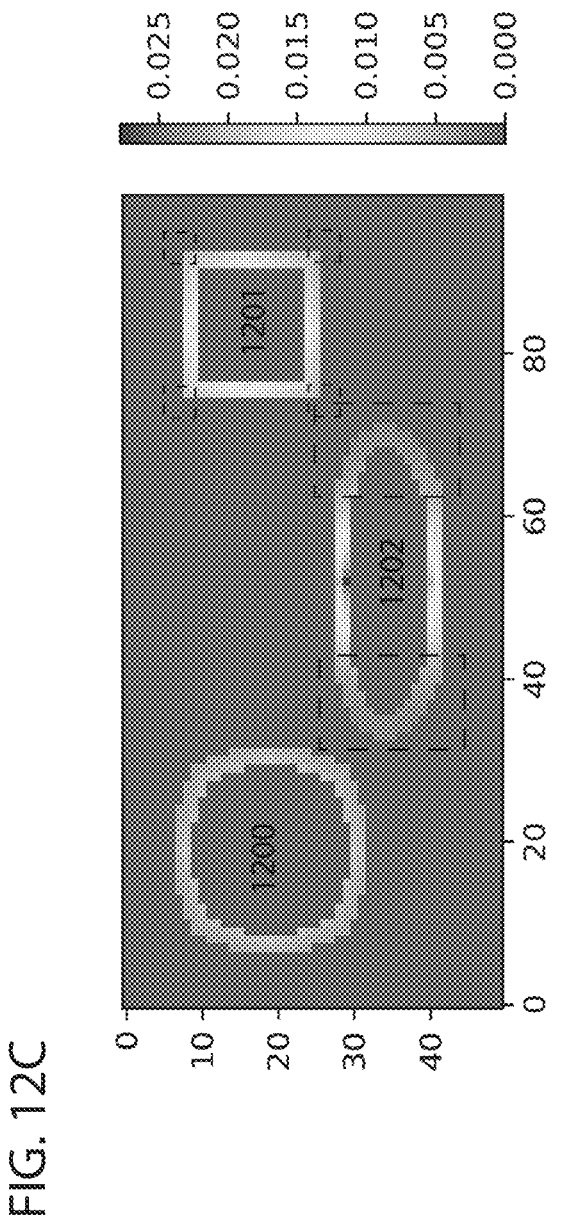

FIG. 12C illustrates values of $$\frac{1}{d^2}$$

for boundary nodes or zones 1200, 1201, and 1202. There is not significant difference in the value of $$\frac{1}{d^2}$$

for boundary nodes in zone 1200 as it is circular. For zone 1201 boundary nodes located at the corners, bounded by dashed lines, are further from the center and therefore have a smaller value for $$\frac{1}{d^2}$$

as compared to boundary nodes along the edges of zone 1202. This is indicated by the inconsistent color between boundary nodes further away from and closer to the center of the zone. Similarly, with zone 1202 being long and slender, boundary nodes located in the middle section are closer to the center of the zone and therefore have greater value for $$\frac{1}{d^2}$$

while boundary nodes on the ends of zones 1202, bounded by dashed lines, are further away and have smaller value for $$\frac{1}{d^2}$$

In embodiments, wherein the control system of the robotic device uses the order of zone coverage to compute the numerical value of each node in $\partial A$, nodes closer to the previous or next zone to be covered increase the numerical value of each node in $\partial A$. An order score may be calculated by the control system of the robotic device using, for example, the following equation:

$$c\left(\frac{1}{az+1}+b\right)$$

wherein a, b, c are constants and $$z = \frac{x - x_{min}}{x_{max} - x_{min}}$$

wherein x is the distance between the boundary node of interest and the closest boundary node in the next zone to be covered, $x_{min}$ is the distance between the closest boundary nodes between the current zone and the next zone to be covered while $x_{max}$ is the distance between the furthest boundary nodes between the current zone and the next zone to be covered. In some embodiments, the order score is then computed by the control system, with z calculated using the current zone and previous zone covered and the order score calculated using the next zone to be covered and previous zone covered are combined by the control system. The constant a controls how sharp the drop of the function is between $x_{min}$ and $x_{max}$, b shifts the entire function along the y axis such that the threshold for assigning negative score may be controlled and c scales the value of the function.

Figure 13:
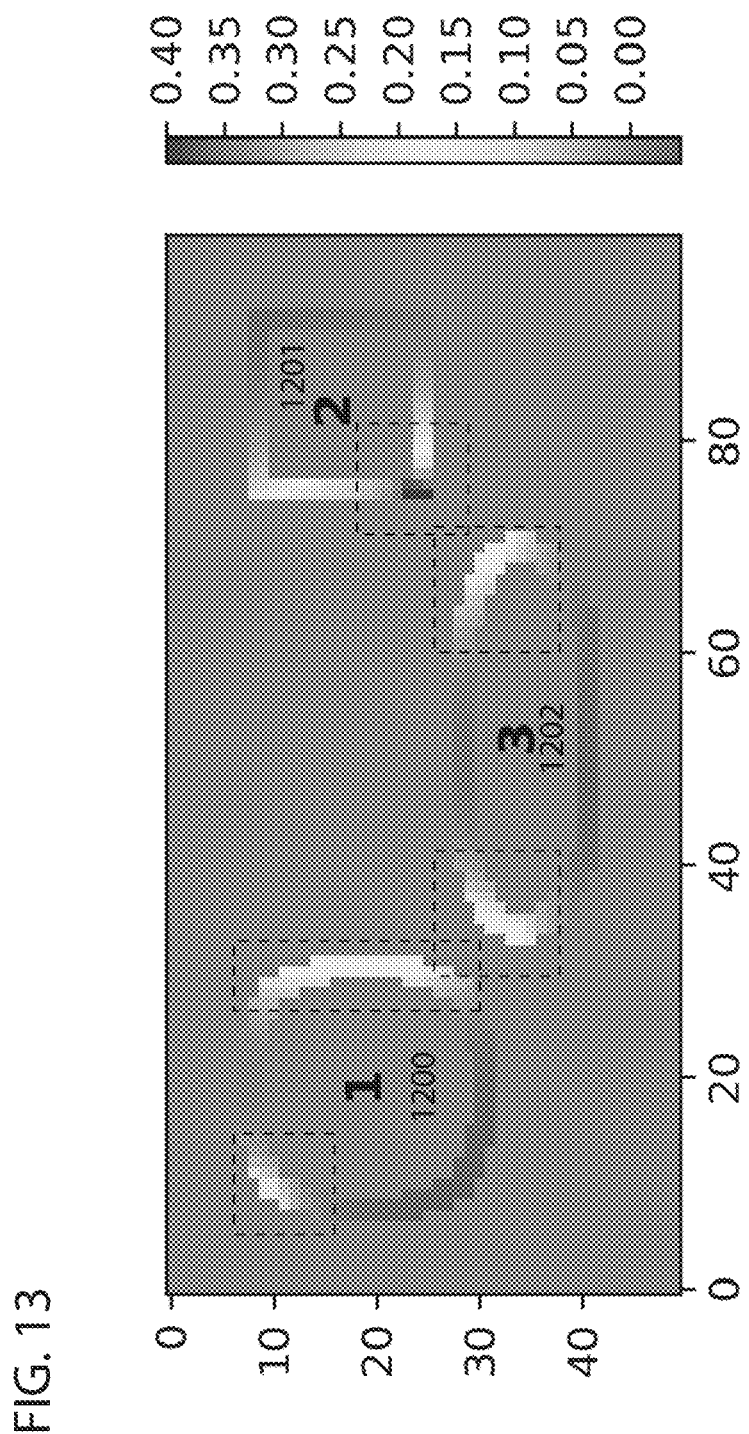
FIG. 13 illustrates an example measure for order of zone coverage used in assigning a numerical value to boundary nodes of a zone, in accordance with some embodiments.

FIG. 13 illustrates the order score for boundary nodes of zones 1200, 1201, and 1202 with same start and end point 1203 (FIG. 12A). The constants used in the illustrated example are a=15, b=−0.2, c=0.1. Boundary nodes of each zone closer to the previous zone covered (or start point) and next zone to be covered (or end point), bounded by dashed lines, have greater score. In some embodiments, individual scores based on growth and decay of the zone, distance of the node from the center of the zone and order of zone coverage are combined by the control system to determine overall numerical value of each node in $\partial A$, wherein areas of zone A containing nodes with high numerical value indicate expansion while those containing nodes with low numerical value indicate contraction. However, in some embodiments the result produced by the control system may be segmented and have non-smooth borders. Therefore, in embodiments a surface smoother score may also be used by the control system in determining the numerical value of each node in $\partial A$. For each node in $\partial A$, a local 3-by-3 grid may be used by the control system, wherein for example, the node is at the center of the grid. In some embodiments, other grid sizes may be used. The number of nodes within the grid within the same area (e.g. inner or outer boundary areas) as the boundary node of interest may be counted by the control system and the overall score of the boundary node may be multiplied by the counted number in order to smoothen boundaries. In some embodiments, the control system of the robot may determine the numerical value of each node in $\partial A$ of zone A by combining scores for growth and decay of the zone, distance of the node from the center of the zone, order of zone coverage and surface smoother.

Figure 14A:
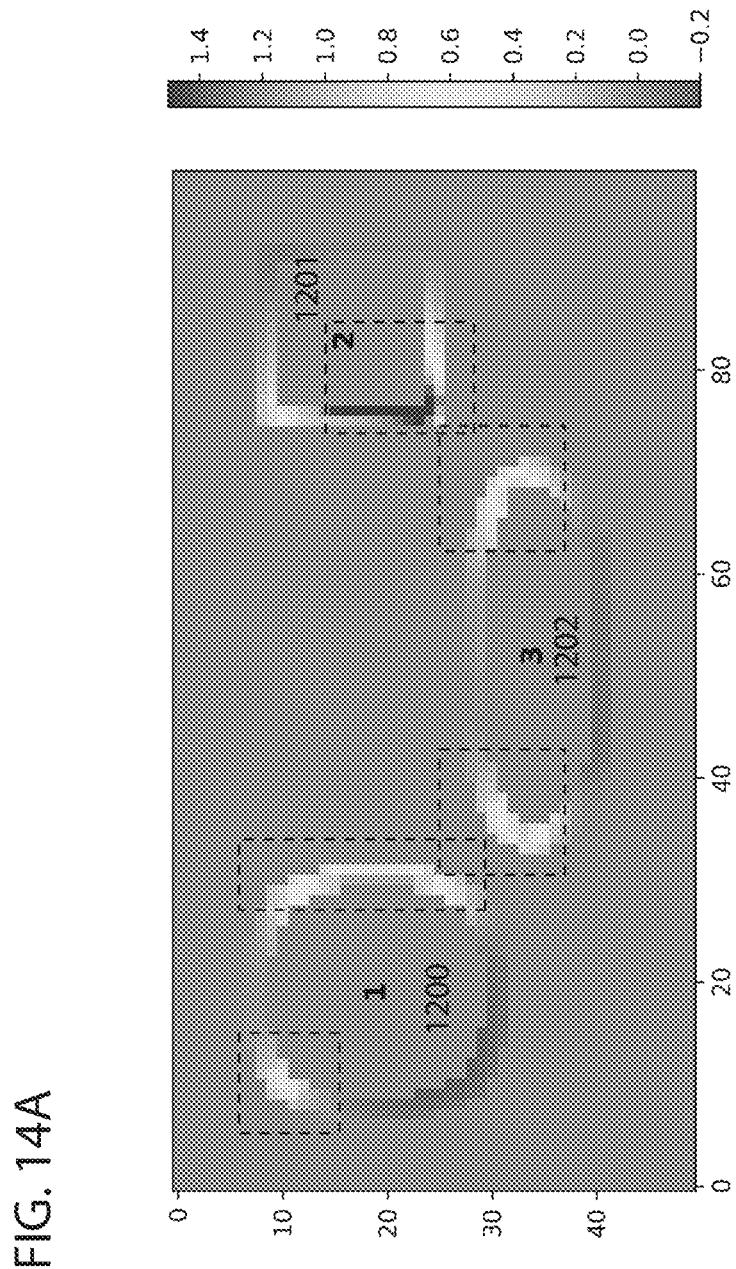
FIGS. 14A and 14B illustrate example numerical values of boundary nodes of zones and expansion/contraction of zones based on magnitude of numerical values of boundary nodes, in accordance with some embodiments.

For example, FIG. 14A illustrates numerical values of boundary nodes for zones 1200, 1201 and 1202 with start and end point 1203 (FIG. 12A) computed by the control system of a robotic device by combining scores for growth and decay of the zone, distance of the node from the center of the zone, order of zone coverage and surface smoother. Areas of zones 1200, 1201, and 1202 containing nodes with high numerical value, bounded by dashed lines, indicate expansion while nodes in other areas with low numerical value indicate contraction. For example, boundary nodes with numerical value less than some value may be removed by the control system while those with numerical value above some value may be added. In this way, the control system may expand a zone A in size by adding nodes from $\partial A^{out}$ (outer boundary nodes) to zone A and may reduce its size by removing nodes in $\partial A^{in}$ (inner boundary nodes) from zone A. Some embodiments may iteratively make such adjustments until a stopping condition, such as an equilibrium, is detected.

Figure 14B:
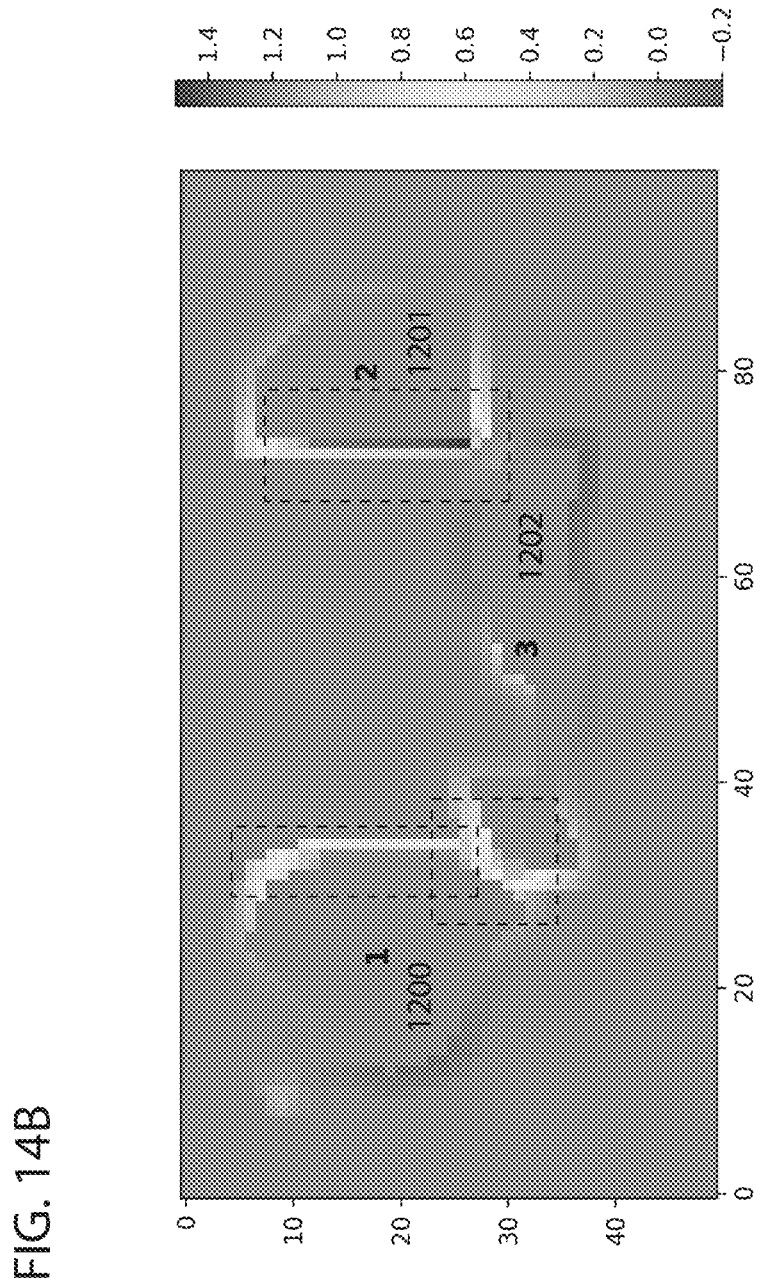

The expansion and contraction are depicted in FIG. 14B as areas of zone 1200, 1201, and 1202 containing nodes with high numerical values as shown in FIG. 14A have expanded after several iteration steps while those with low numerical values have contracted. This allows ordered zones to come closer together to reduce travel distance between sequentially ordered zones while expanding to cover more area of the workspace. Areas of zones 1200, 1201, and 1202 bounded by dashed lines in FIG. 14B contain boundary nodes with high numerical value therefore the control system will continue to expand those areas with more iterations while areas with boundary nodes with low numerical value will contract. In embodiments, additional functions may be used by the control system of the robotic device to improve performance of zone optimization such as discover, delete and aggressive growth functions described earlier. Furthermore, additional features may be used in computing the numerical value of boundary nodes, which is not to suggest that other descriptions are limiting.

In some embodiments, a control system of a robotic device may determine the best division of a workspace by minimizing a cost function defined as the difference between theoretical (e.g., modeled with uncertainty) area of the workspace and the actual area covered. The theoretical area of the workspace may be determined by the control system using a map of the environment. The actual area covered may be determined by the control system by recorded movement of the robotic device using, for example, an odometer or gyroscope. In embodiments, the control system may determine the best division of the workspace by minimizing a cost function dependent on a path taken by the robotic device comprising the paths taken within each zone and in between zones. The control system may restrict zones to being rectangular (or having some other defined number of vertices or sides) and may restrict the robotic device to entering a zone at a corner and to driving a serpentine routine in either x- or y-direction such that the trajectory ends at another corner of the zone. The cost associated with a particular division of a workspace and order of zone coverage may be computed as the sum of the distances of the serpentine path travelled for coverage within each zone and the sum of the distances travelled in between zones (corner to corner).

Figure 15:
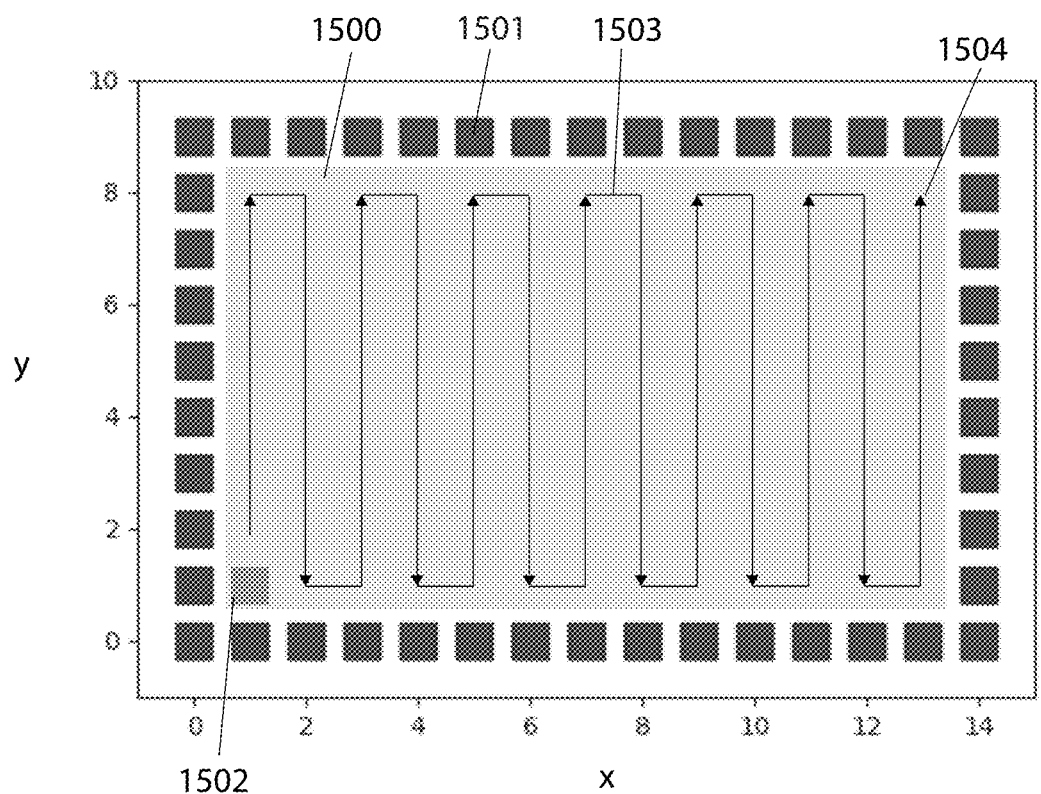
FIGS. 15-18B illustrate patterns followed by embodiments implementing a method for optimizing surface coverage of a workspace with rectangular zones, in accordance with some embodiments.

For example, FIG. 15 illustrates an example of rectangular zone 1500 of the workspace with perimeter 1501. Each square division may represent a single unit and may be used by the control system to compute distance travelled within the zone. From starting position 1502 at the lower left corner the robotic device may follow serpentine path 1503 to position 1504 at the top right corner of the zone. Assuming zone 1500 is the only zone of the workspace, the robotic device returns back to initial position 1502. The control system computes the distance of serpentine path 1503 and the return path to position 1504 as 122 units and assigns the cost to this particular division of the workspace and order of zone coverage. In some cases, a portion of the area of a zone is covered with a serpentine path, e.g., some embodiments may navigate around some or all of a perimeter of a zone before covering the interior with a serpentine path. To minimize cost function and improve surface coverage efficiency zones may be further divided, merged, reordered for coverage and entry/exit points of zones may be adjusted. In some embodiments, the control system of the robotic device may initiate these actions at random or may target them. In some embodiments, wherein actions are initiated at random (e.g., based on a pseudorandom value) by the control system, the control system may choose a random action such as, dividing, merging or reordering zones, and perform the action. The control system may then optimize entry/exit points for the chosen zones and order of zones. A difference between the new cost and old cost may be computed as $\Delta$=new cost−old cost by the control system wherein an action resulting in a difference<0 is accepted while a difference>0 is accepted with probability $\exp(-\Delta/T)$ wherein T is a scaling constant. Since cost, in some embodiments, strongly depends on randomly determined actions the control system of the robotic device, embodiments may evolve 10 different instances and after a specified number of iterations may discard a percentage of the worst instances.

Figure 16A:
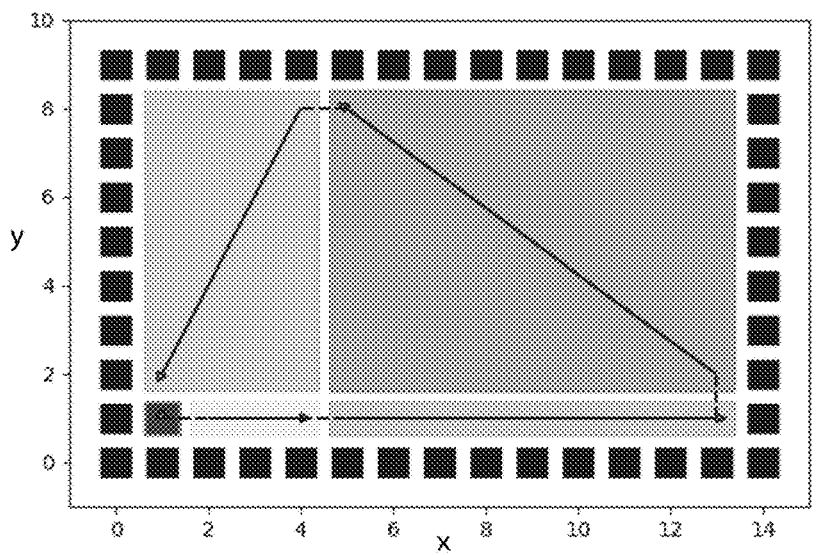
Figure 16B:
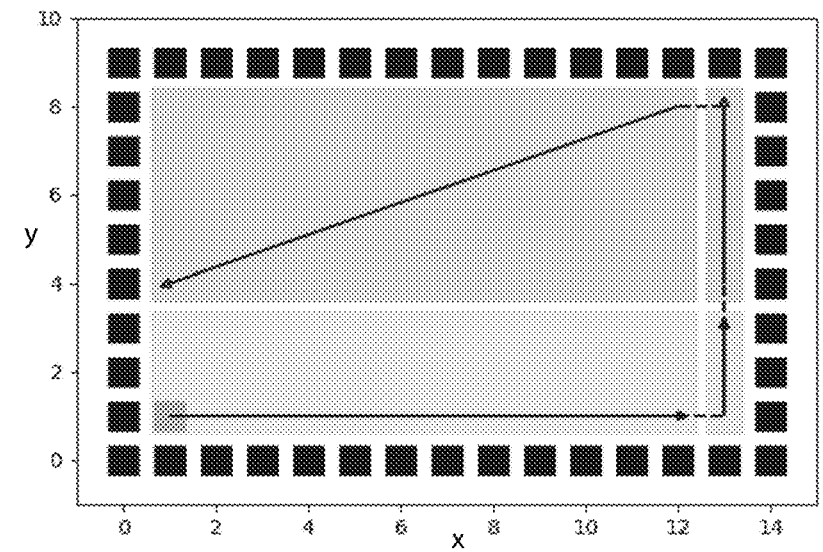
Figure 16C:
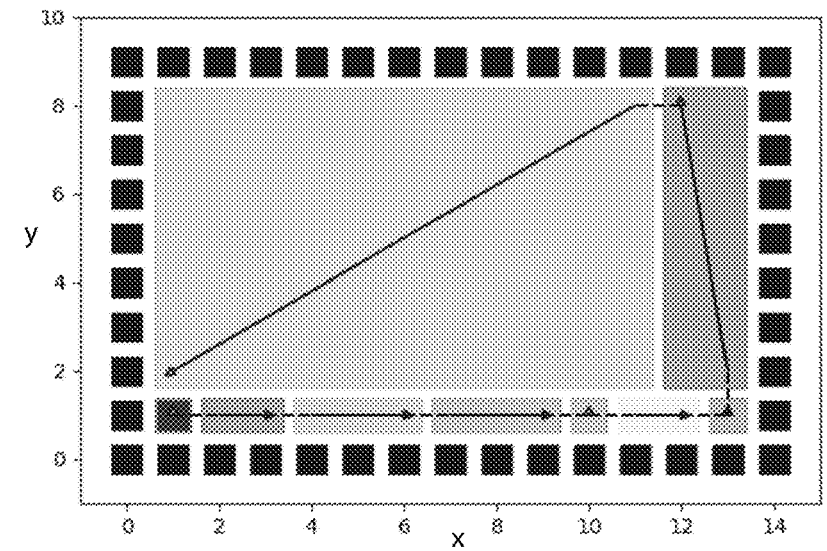
Figure 17:
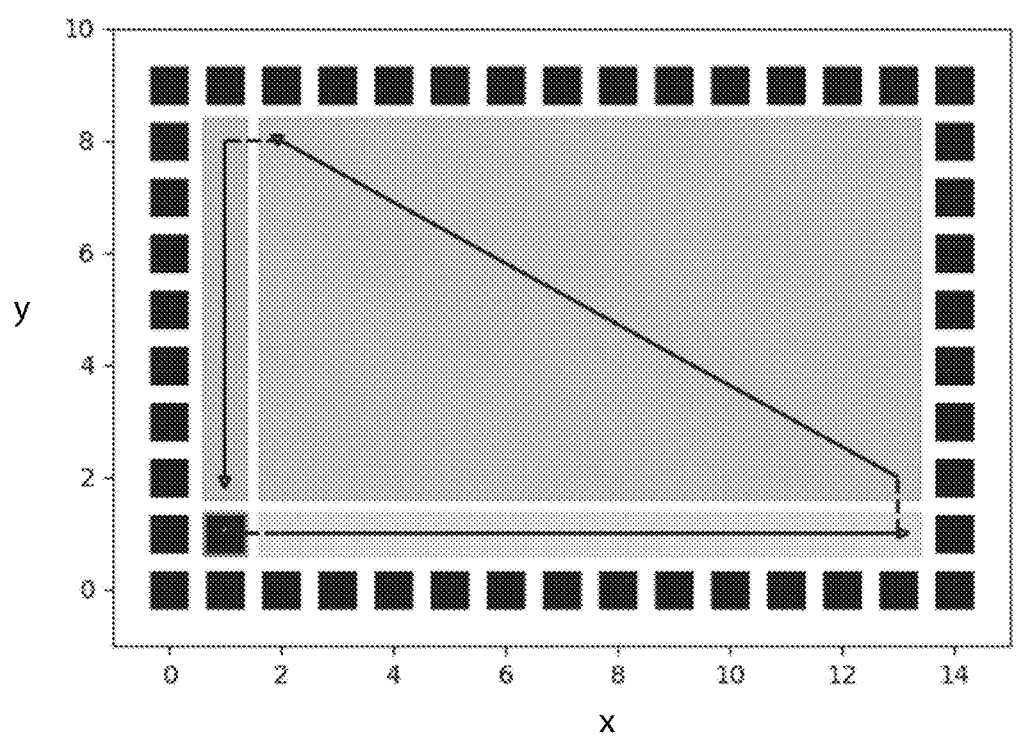
Figure 18A:
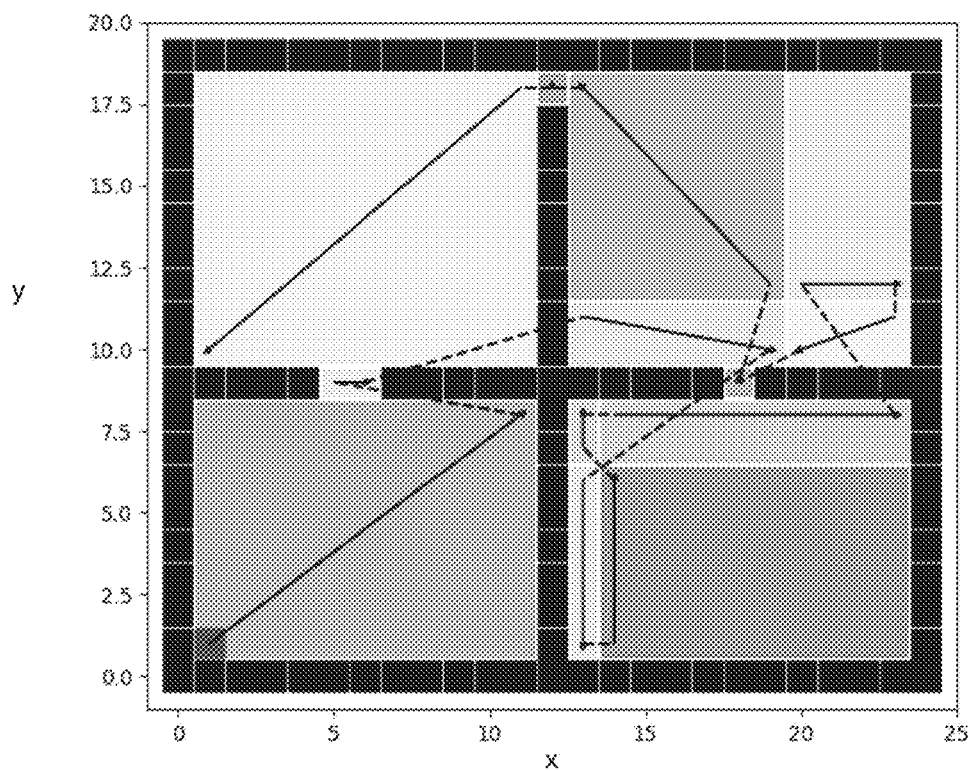
Figure 18B:
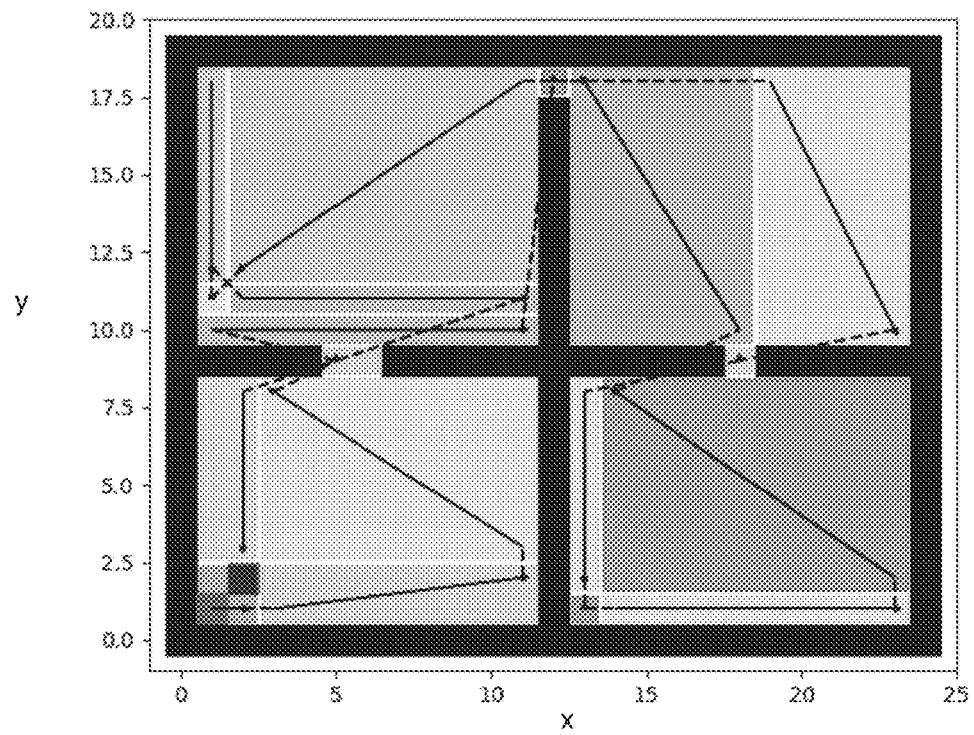

In embodiments, the control system may actuate the robotic device to execute the best or a number of the best instances and calculate actual cost. For example, FIG. 16A illustrates a random action approach to minimizing the cost function resulting in improved division and order of zones of the same workspace shown in FIG. 15. Rectangular divisions indicate different zones and arrows indicate order of coverage of the zones as well as entry and exit points of each zone. Serpentine coverage of each zone is not shown, but may be implemented. The new cost is 104 as compared to 122 for the zone coverage in FIG. 15 and avoids repeat coverage of areas. FIGS. 16B and 16C illustrate other instances resulting from random action approach to minimizing the cost function, with cost 106 and 104, respectively. In embodiments, wherein actions are targeted, the control system may find the greatest cost contributor, such as the largest travel cost, and initiate a targeted action to reduce the greatest cost contributor. For example, FIG. 17 illustrates a targeted action approach to minimizing the cost function wherein greatest cost generator in FIG. 15, caused by travel distance from end point 1503 back to starting position 1501, is identified and eliminated by the control system resulting in improved division and order of zones of the same workspace. The new cost is 104 as compared to 122 for zone coverage shown in FIG. 15 and avoids repeat coverage of areas. In embodiments, random and targeted action approaches to minimizing the cost function may be applied to workspaces comprising multiple rooms by the control system of the robotic device. For example, FIGS. 18A and 18B illustrate zone division and order of zone coverage of a workspace comprising four rooms determined by the control system from minimizing the cost function by random and targeted action approaches, respectively. Arrows illustrate the order of zone coverage and entry/exit points of each zone. Serpentine paths within each zone are not illustrated. In embodiments, the control system may directly actuate the robotic device to execute coverage for a specific division of the workspace and order of zone coverage without first evaluating different possible divisions and orders of zone coverage by simulation. In embodiments, the control system may determine the best division of the workspace by minimizing a cost function comprising some measure of the theoretical area of the workspace, the actual area covered, and the path taken by the robotic device within each zone and in between zones.

Figure 19A:
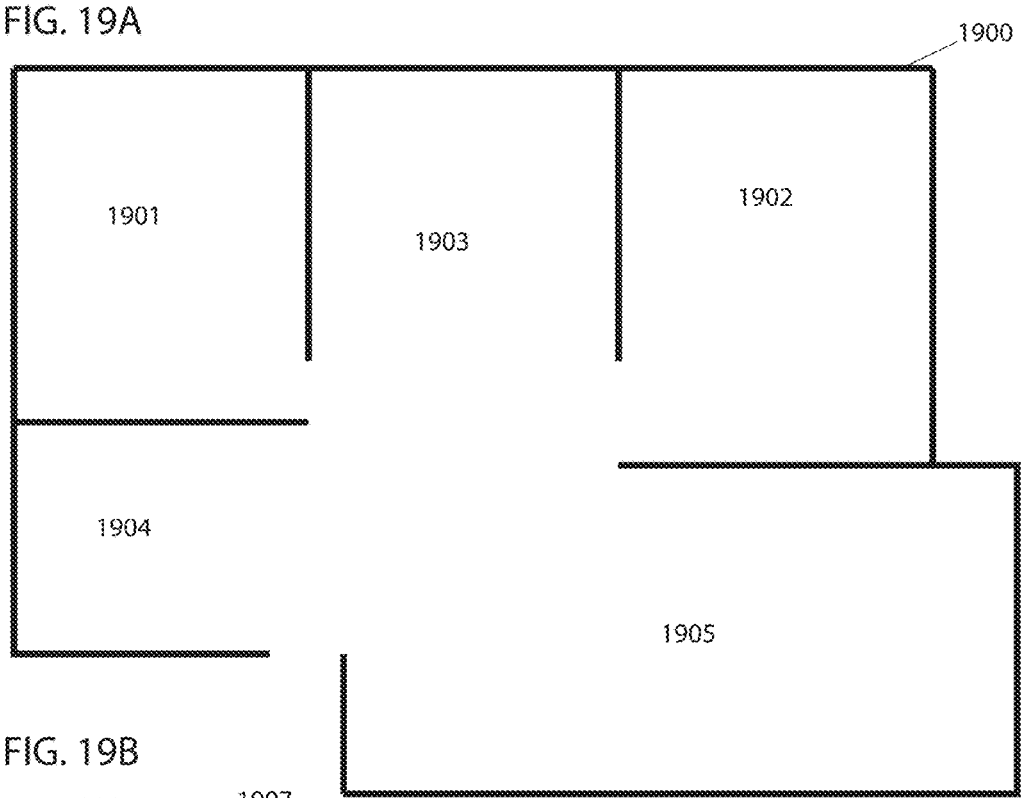
FIG. 19A-19C illustrates optimization of zone division and order of zone coverage of a workspace, in accordance with some embodiments.
Figure 19B:
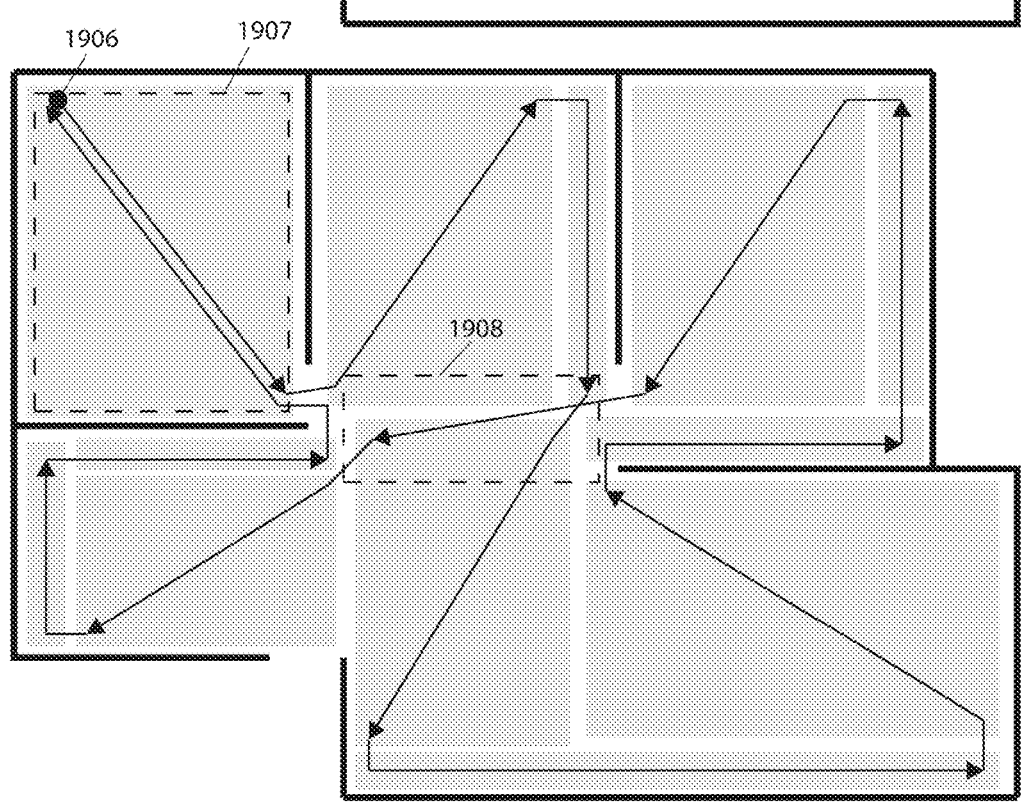
Figure 19C:
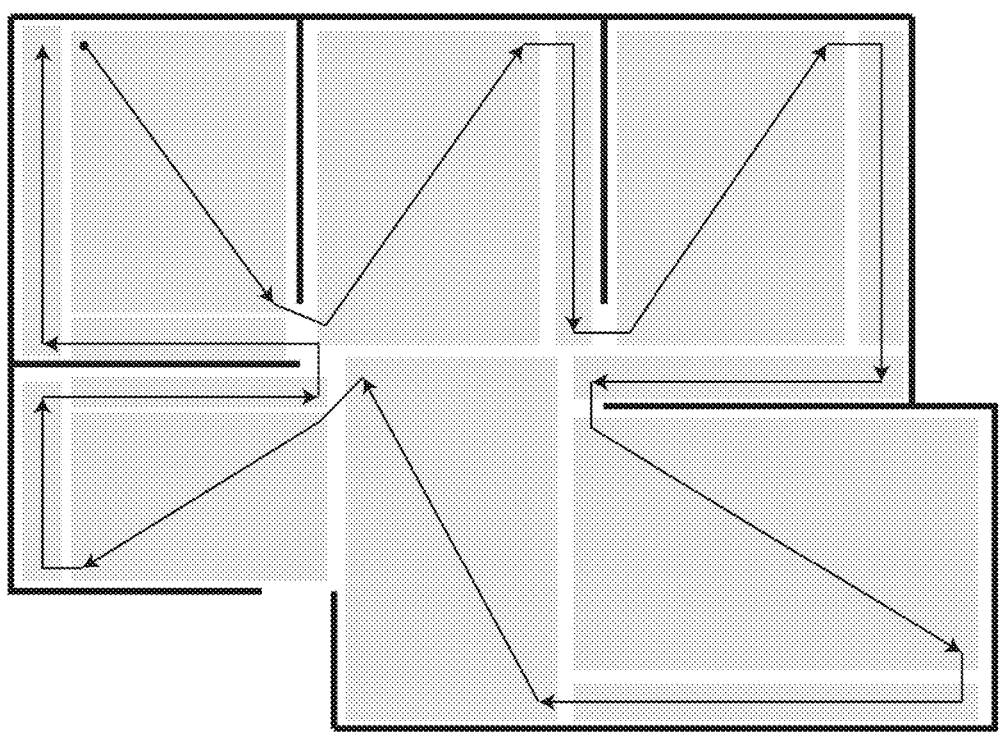

In embodiments, a control system of a robotic device may evaluate different divisions of a workspace while offline. For example, workspace 1900 in FIG. 19A includes bedrooms 1901 and 1902, living room 1903, entry area 1904 and kitchen/dining area 1905. While offline, the control system may initially divide and order zones of workspace 1900 for coverage as shown in FIG. 19B, wherein zones are shown by rectangular divisions and the order of zone coverage as well as entry/exit points of each zone is indicated by arrows with starting position 1906. Before starting coverage of workspace 1900 the control system may iterate through divisions of the workspace and order of zone coverage to find the division and order of zone coverage that optimizes (e.g., locally or globally) the route for an objective function like those described above. For example, the order of zone coverage in FIG. 19B is not efficient as the robotic device would need to back track resulting in repeat coverage in areas within dashed lines 1907 and 1908. The control system may iterate and divide and order zones of the workspace for coverage as shown in FIG. 19C, wherein back tracking and hence repeat coverage of areas is minimized.

In some embodiments, the control system of the robotic device may divide the workspace into zones using one or more generated points on the map of the workspace. In some embodiments, each zone may be considered a zone having a subset of the plurality of cells as described herein. In some embodiments, the control system positions points at strategic locations, such as at the interface between a wall and a door, along a wall, adjacent to furniture, or at locations adjacent to other possible dividers within the workspace. Such strategic locations may be selected with a variety of techniques. Some embodiments may iteratively shift a perimeter of a map inward until edges make contact and designate the source locations of the perimeter on the original map for the points of contact as strategic locations. Some embodiments may select an arbitrary vertex (e.g., one with a largest or smallest value of one or more coordinates) of a perimeter of a map (which may include multiple nested perimeters in some cases, and some embodiments may repeat this process for each perimeter). Some embodiments may then traverse the perimeter in a clockwise direction and designate vertices as convex or concave based on whether the vertex is a turn to the right (e.g., convex) or left (e.g., concave), or vice versa for counter clockwise transits. Right and left turns may be determined based whether an angle of the vertex is greater or less than 180 degrees. Some embodiments may select strategic points based on whether vertices are concave, e.g., by selecting the concave vertices or selecting a subset of the concave vertices more than a threshold distance from an adjacent convex vertex. In some embodiments, the points are randomly positioned within the workspace. In some embodiments, for each generated (or otherwise selected, e.g., with the aforementioned techniques) point, the control system of the robotic device measures (e.g., determines from the map) distances from the point to perimeters of the workspace (e.g., of a ray extending from the point) within a 360-degree angular range. In some embodiments, for each point, the control system compares measured distances within the 360-degree range and selects the perimeter location closest to the respective point (e.g., a point where a shortest ray intersects the perimeter). In other instances, other factors are considered in selecting the line used to divide the workspace. For example, the control system may consider (e.g., perform computations based on) the size and/or shape of the zone created (e.g., some embodiments may constrain the aspect ratio or cumulative area to less than a maximum value or more than a minimum value). In some embodiments, the control system measures distances from each point to perimeters of the workspace within any angular range between 0 to 360 degrees. In some embodiments, the control system generates a line from each respective point to the chosen perimeter location, thereby dividing the workspace into zones. Some embodiments may divide the workspace into zones that are meaningful to a human (as opposed to arbitrary division of spaces into something like grid squares), e.g., some embodiments may segment spaces in maps into rooms, like areas separated from other areas by a doorway, areas a perimeter of a map indicates have distinct geometries (like those separated from other such areas by narrowing areas of the perimeter), and areas in which internal obstacles indicate have a distinct function (like obstacles in the form a dining table and chairs that indicate a dining room). In some embodiments, a variety of other techniques may be implemented to partition a plane in such a manner, e.g., with a Voroni plane partition seeded by points determined to be furthest from perimeters and each other, or with various other morphological segmentation techniques used in computer vision based on erosion and dilation of map features until openings or closings are detected. In some cases, areas may be divided hierarchically, e.g., with sub-areas corresponding to different uses detected with the techniques above, like into a tree with 2, 3, 4, or more levels of hierarchy.

Figure 20A:
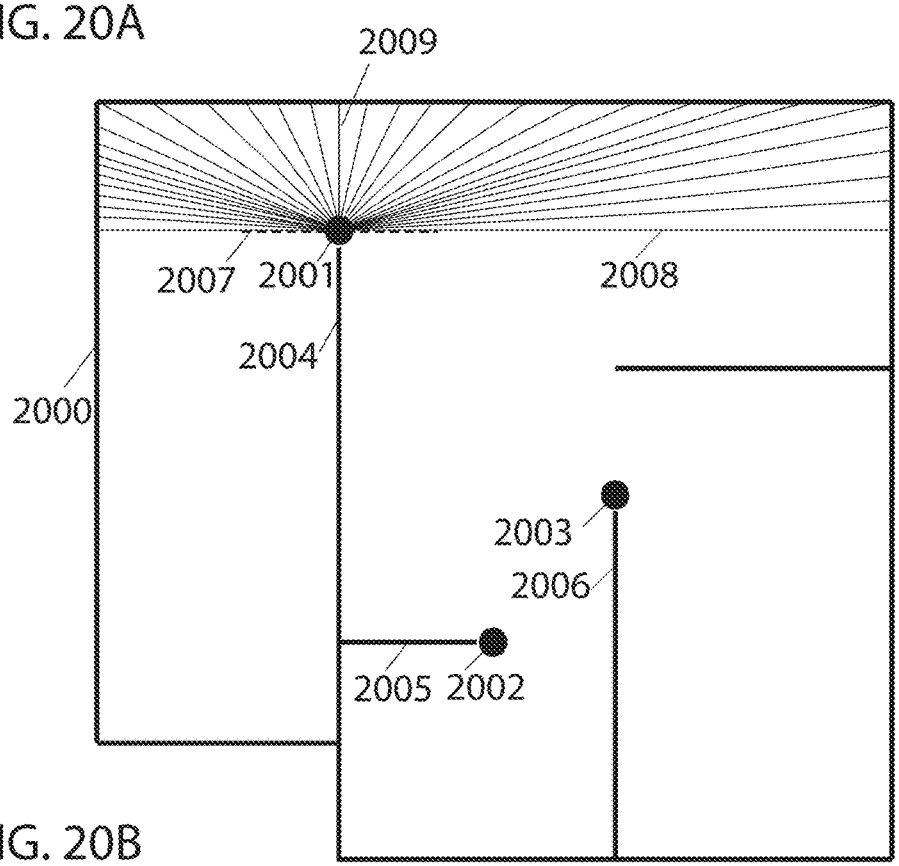
FIGS. 20A and 20B illustrate an example of a method for dividing a workspace into zones, in accordance with some embodiments.
Figure 20B:
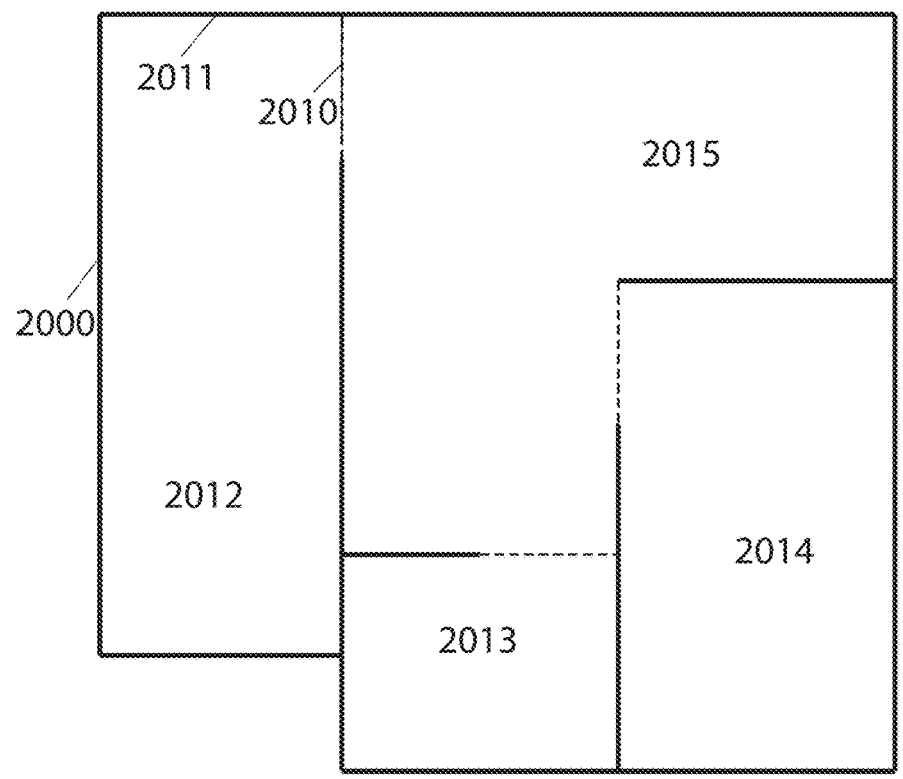

For example, FIG. 20A illustrates a map of a workspace 2000 with points 2001, 2002, and 2003 strategically located at the end of perimeter lines 2004, 2005, and 2006, respectively, that interface with doors of the workspace. In this example, the control system generates a line 2007 perpendicular to the respective perimeter line 2104 and calculates distances 2008 from the respective point 2001 to perimeters of the workspace within a 180-degree angular range spanning the side of the perpendicular line 2007 that is facing towards the opening in the perimeter. Given that the points are generated at interfaces between walls and doors, measuring distances on the other side of the perpendicular line are not considered because unfavorable zones are likely to result. The control system, chooses the smallest measured distance 2009 and divides the workspace by creating a line 2010 connecting the point 2001 to the perimeter line 2011, corresponding with the smallest measured distance, as shown in FIG. 20B. The same method is executed for points 2102 and 2103, resulting in the workspace divided into zones 2012, 2013, 2014, and 2015. In some embodiments, the control system divides the workspace into zones by creating lines in the map of the workspace at random. In some embodiments, the control system divides the workspace into zones by creating strategic lines in the map of the workspace, such as at gaps created by, for example, doors. In some embodiments, there is a predetermined minimum and maximum number of zones that can be created for a particular surface area. Further details of these methods for dividing a workspace into zones are described in U.S. Patent App. No. 62/590,205, the entirety of the contents of which are incorporated herein by reference. In some embodiments, the different possible divisions of the workspace are evaluated using the methods described herein. For example, zones (i.e., the placement of a points and the chosen perimeter locations to which the points are connected to create zones) may be chosen based on maximizing a reward (e.g., an aggregate score, like an ordinal or cardinal value) computed based on actual surface coverage, repeat coverage, total coverage time, travel distance between zones, etc., and the control system assigns the reward to a policy that includes (e.g., by having a copy of, or the same instance as discussed above of) the zones created (e.g. size, shape, location), the order in which they were covered and coverage path to determine the most optimal coverage of a workspace, as described above.

In some embodiments, the control system of the robotic device determines a coverage path for each zone using methods such as those described in U.S. patent application Ser. Nos. 16/041,286, 15/406,890, 14/673,633, 16/163,530, and U.S. Pat. No. 9,764,472, the entirety of the contents of which are incorporated herein by reference.

In some embodiments, a map of the workspace may be, for example, a Cartesian coordinate map, a polar coordinate map, a homogenous coordinate map or various other types of coordinate system map.

Embodiments of the method disclosed herein are expected to improve surface coverage of a workspace by a robotic device relative to conventional approaches by, for example, reducing repeat coverage of areas and/or by reducing total coverage time. Repeat coverage may occur when the robotic device travels from its end point in one zone to its starting point in the next zone. Repeat coverage may also occur as a result of movement noise wherein the actual position of the robotic device does not coincide with the position perceived by the control system of the robotic device. The robotic device moves in a continuous world; however, the map and sensors of the robotic device used by the control system in perceiving its position are subject to resolution and accuracy constraints in some cases. For example, the control system may perceive the position of the robotic device to be at a perimeter of a zone when in fact it is still positioned within the zone. This may lead to zones overlapping and repeat coverage. In some instances, the control system of the robotic device may be configured to actuate the robotic device to cover all areas of a workspace. For example, in cases wherein the position of the robotic device drifts and areas remain uncovered, the robotic device may be actuated by the control system to return and cover such areas. In some embodiments, the control system of the robotic device may include some degree of repeat coverage of areas by the robotic device to avoid uncovered areas in between zones.

In some embodiments, multiple robotic devices may be used to collaborate together in servicing one large workspace. An example of a method for collaboration between robotic devices is described in U.S. patent application Ser. Nos. 16/185,000, 15/048,827, 15/981,643, and 15/986,670, the disclosure of which is hereby incorporated by reference. In some embodiments, collaborating robotic devices communicate their coverage matrices with one another. In some embodiments, robotic devices may avoid the areas already covered or to be covered by other robotic devices. Therefore, control systems of robotic devices may avoid creating zones that encompass areas already covered or selected by other control systems of robotic devices for coverage. The policy of a robotic device and the reward assigned may be dependent on the policies executed by other robotic devices. Over time, the policies of all robotic devices may converge such that the policy executed by each robotic device maximizes the overall reward. Nash's existence theorem demonstrates that because there is a finite number of robotic devices, and each robotic device can choose from a finite number of pure strategies, and strategies are mixed by definition, there will be at least one Nash equilibrium.

In some embodiments, multiple robotic devices may compete to service uncovered areas, so the policy created incorporates values from the sessions of all participating robotic devices. In some cases, the robotic devices may be configured at setup to give them some basic information, such as how many robotic devices exist in the system. If there is no configuration, the system of robotic devices may converge and select the best possible solutions as explained above. As Nash's existence theorem explains, because there are a finite number of robotic devices and each robotic device can choose from a finite number of pure strategies, and strategies are mixed by definition, there will be at least one Nash equilibrium that is comprised in the converged policy.

Figure 21:
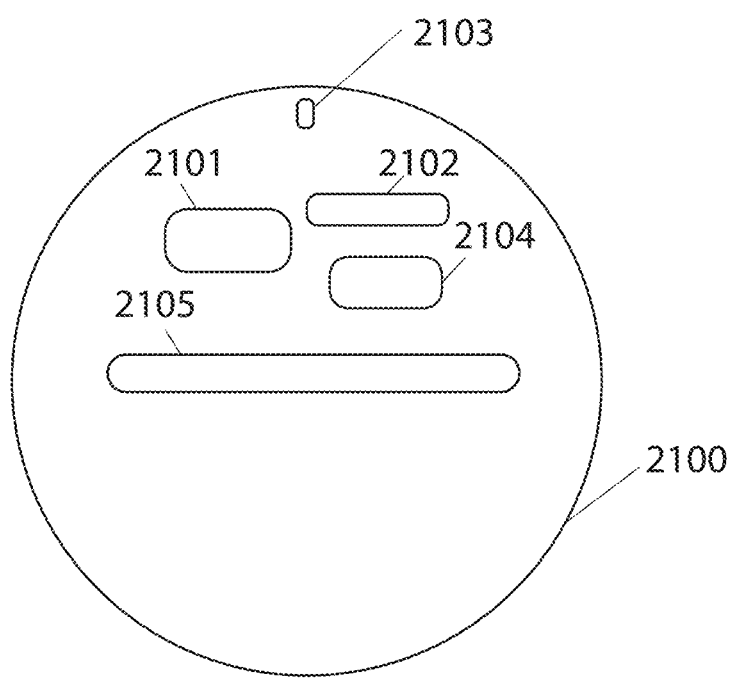
FIG. 21 is a schematic diagram of an example of a robot with which the present techniques may be implemented.

FIG. 21 depicts an example of a robotic device 2100 with control system (such as a processor) 2101, memory 2102, sensor 2103, actuator 2104, and cleaning tool 2105. In some embodiments, the robot may include the features of a robot described herein. In some embodiments, program code stored in the memory 2102 and executed by the control system 2101 may effectuate the operations described herein. The robot may also include other components and features not shown, such as additional sensors and processors, cameras, odometers, etc.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpindicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

The present techniques will be better understood with reference to the following enumerated embodiments:

1. A robot, comprising: an actuator configured to move the robot in a workspace; a sensor configured to sense the workspace; one or more processors including at least one processor configured to obtain data from the sensor and control the actuator; and memory communicatively coupled with at least one of the one or more processors and storing instructions that when executed by the at least one of the one or more processors effectuate operations comprising: obtaining, with the one or more processors, a map of the workspace, the map quantizing the workspace into a plurality of cells, each cell corresponding to an area of the workspace; segmenting, with the one or more processors, the workspace into a plurality of zones, each zone having a subset of the plurality of cells; determining, with the one or more processors, a sequence of the zones among a plurality of candidate sequences based on an effect of the sequence on a cost of a cost function that is based on travel distance of the robot through the sequence; and causing, with the one or more processors, the robot to traverse the zones in the determined sequence.
2. The robot of embodiment 1, wherein: the cells are unit tiles of a regular Euclidean tiling; the zones and the sequence are jointly optimized or separately optimized; the robot is a floor-cleaning robot; and traversing the zones comprises traversing at least some of the zones with a serpentine coverage path in which a cleaning tool is applied.
3. The robot of any one of embodiments 1-2, wherein the operations comprise: iteratively adjusting size of at least one of the zones based on the cost function or another cost or reward function.
4. The robot of any one of embodiments 1-3, wherein: the number of zones is less than 14; the number of candidate sequences is less than 100 billion; the sequence is determined without performing a brute force search of more than 0.1% of the candidate sequence by the one or more processors; and the one or more processors are on-board processors of a battery-powered floor cleaning robot.
5. The robot of any one of embodiments 1-4, wherein: the sequence is determined with a greedy optimization that adjusts the sequence based on incremental adjustments that reduce cost relative to a current sequence.

6. The robot of any one of embodiments 1-5, wherein: the sequence is determined based on starting or ending locations of coverage paths in at least some of the zones.
7. The robot of any one of embodiments 1-6, wherein segmenting the workspace comprises: iteratively, until a stopping condition is detected, through a plurality of iterations, adding cells to at least some of the zones based on the added cells being adjacent perimeters of the zones to which the cells are added.
8. The robot of embodiment 7, wherein segmenting the workspace comprises: adding cells to at least part of a perimeter of a given zone among the plurality of zones; and removing cells from at least part of the perimeter of the given zone in an iteration of an iterative adjustment in which the cells are added.
9. The robot of embodiment 7, wherein segmenting the workspace comprises: determining to add a cell adjacent a perimeter of a given zone to the given zone based on at least one of the following factors: size of the given zone, distance of the cell from a center of the given zone, order of the given zone in the sequence, or a score indicative of smoothness of the perimeter of the given zone.
10. The robot of embodiment 7, wherein segmenting the workspace comprises: determining to add a cell adjacent a perimeter of a given zone to the given zone based on each of the following factors: a size of the given zone, distance of the cell from a center of the given zone, order of the given zone in the sequence, and a score indicative of smoothness of the perimeter of the given zone.
11. The robot of any one of embodiments 1-10, wherein: at least some of the zones and at least part of the sequence are adjusted based on performance of the robot in the workspace determined based on data from the sensor.
12. The robot of any one of embodiments 1-11, wherein: the zones, coverage paths in the zones, or the sequence is adjusted in response to detecting areas of duplicate measured coverage of the robot; and coverage is measured with the sensor.
13. The robot of any one of embodiments 1-12, wherein: the zones, coverage paths in the zones, or the sequence is specified by a policy of the robot that maps state of the robot to actions to be taken by the robot when in the respective state; and the operations comprise adjusting the policy based on a reward function.
14. The robot of embodiment 13, wherein: the reward function is based on at least one of measured surface coverage, travel distance, duplicate coverage, or coverage time.
15. The robot of embodiment 13, wherein: the reward function is based on each of measured surface coverage, travel distance, duplicate coverage, and coverage time.
16. The robot of any one of embodiments 1-15, wherein: the cost function is further based on at least one of measured surface coverage, duplicative coverage, or coverage time.
17. The robot of any one of embodiments 1-15, wherein: the cost function is further based on each of measured surface coverage, duplicative coverage, or coverage time.
18. The robot of any one of embodiments 1-17, wherein: traversing the zones comprises cleaning a floor under a coverage path in at least some of the zones with a vacuum and measuring coverage with an odometer; and the zones are adjusted based on distance measured and duplicate coverage detected with the odometer.
19. The robot of any one of embodiments 1-18, wherein: coverage of the workspace by the robot is determined by the robot based on a policy of the robot; and the operations comprise adjusting the policy to increase a reward of a reward function or reduce a cost of a cost function with an unsupervised reinforcement learning model.
20. The robot of any one of embodiments 1-19, wherein segmenting comprises: detecting an interface between a wall and a doorway indicated by the map; and determining a boundary between a first zone and a second zone among the plurality of zones based on the detected interface and a distance from the detected interface to a perimeter of the map.
21. The robot of any one of embodiments 1-20, wherein segmenting comprises: selecting a plurality of locations in the map; determining, for each location among the plurality of locations, a respective plurality of distances to a perimeter of the map at each of a plurality of different angles; and determining at least some of the plurality of zones based on at least some of the plurality of distances.
22. The robot of embodiment 21, wherein determining at least some of the plurality of zones based on at least some of the plurality of distances comprises: selecting a first location on the perimeter where a shortest ray among a plurality of rays from a second location among the plurality of locations intersects the perimeter; and determining a boundary between a first zone and a second zone among the plurality of zones based on the first location and the second location.
23. A method, comprising: the operations of any one of embodiments 1-22.
24. A tangible, non-transitory medium storing instructions that when executed by one or more processors effectuate operations comprising: the operations of any one of embodiments 1-22.
25. A method, comprising: obtaining, with one or more processors of a robot, a map of a workspace, the map quantizing the workspace into a plurality of cells, each cell corresponding to an area of the workspace; segmenting, with the one or more processors of the robot, the workspace into a plurality of zones, each zone having a subset of the plurality of cells; determining, with the one or more processors of the robot, a sequence of the zones among a plurality of candidate sequences based on an effect of the sequence on a cost of a cost function that is based on travel distance of the robot through the sequence; and causing, with the one or more processors of the robot, the robot to traverse the zones in the determined sequence.

What is claimed is:
1. A robot, comprising:
an actuator configured to move the robot in a workspace;
a sensor configured to sense the workspace;
one or more processors including at least one processor configured to obtain data from the sensor and control the actuator; and
memory communicatively coupled with at least one of the one or more processors and storing instructions that when executed by the at least one of the one or more processors effectuate operations comprising:
obtaining, with the one or more processors, a map of the workspace, the map quantizing the workspace into a plurality of cells, each cell corresponding to an area of the workspace;
segmenting, with the one or more processors, the workspace into a plurality of zones, each zone having a subset of the plurality of cells, wherein segmenting the workspace comprises iteratively, until a stopping condition is detected, through a plurality of iterations, adding cells to at least some of the zones based on the added cells being adjacent perimeters of the zones to which the cells are added;

determining, with the one or more processors, a sequence of the zones among a plurality of candidate sequences based on an effect of the sequence on a cost of a cost function that is based on travel distance of the robot through the sequence; and causing, with the one or more processors, the robot to traverse the zones in the determined sequence.

2. The robot of claim 1, wherein:
the cells are unit tiles of a regular Euclidean tiling;
the zones and the sequence are jointly optimized or separately optimized;
the robot is a floor-cleaning robot; and
traversing the zones comprises traversing at least some of the zones with a serpentine coverage path in which a cleaning tool is applied.

3. The robot of claim 1, wherein the operations comprise:
iteratively adjusting size of at least one of the zones based on the cost function or another cost or reward function.

4. The robot of claim 1, wherein:
the number of zones is less than 14;
the number of candidate sequences is less than 100 billion;
the sequence is determined without performing a brute force search of more than 0.1% of the candidate sequence by the one or more processors; and
the one or more processors are on-board processors of a battery-powered floor cleaning robot.

5. The robot of claim 1, wherein:
the sequence is determined with a greedy optimization that adjusts the sequence based on incremental adjustments that reduce cost relative to a current sequence.

6. The robot of claim 1, wherein:
the sequence is determined based on starting or ending locations of coverage paths in at least some of the zones.

7. The robot of claim 1, wherein segmenting the workspace comprises:
adding cells to at least part of a perimeter of a given zone among the plurality of zones; and
removing cells from at least part of the perimeter of the given zone in an iteration of an iterative adjustment in which the cells are added.

8. The robot of claim 1, wherein segmenting the workspace comprises:
determining to add a cell adjacent a perimeter of a given zone to the given zone based on at least one of the following factors: size of the given zone, distance of the cell from a center of the given zone, order of the given zone in the sequence, or a score indicative of smoothness of the perimeter of the given zone.

9. The robot of claim 1, wherein segmenting the workspace comprises:
determining to add a cell adjacent a perimeter of a given zone to the given zone based on each of the following factors: a size of the given zone, distance of the cell from a center of the given zone, order of the given zone in the sequence, and a score indicative of smoothness of the perimeter of the given zone.

10. The robot of claim 1, wherein:
at least some of the zones and at least part of the sequence are adjusted based on performance of the robot in the workspace determined based on data from the sensor.

11. The robot of claim 1, wherein:
the zones, coverage paths in the zones, or the sequence is adjusted in response to detecting areas of duplicate measured coverage of the robot; and
coverage is measured with the sensor.

12. The robot of claim 1, wherein:
the zones, coverage paths in the zones, or the sequence is specified by a policy of the robot that maps state of the robot to actions to be taken by the robot when in the respective state; and
the operations comprise adjusting the policy based on a reward function.

13. The robot of claim 12, wherein:
the reward function is based on at least one of measured surface coverage, travel distance, duplicate coverage, or coverage time.

14. The robot of claim 12, wherein:
the reward function is based on each of measured surface coverage, travel distance, duplicate coverage, and coverage time.

15. The robot of claim 1, wherein:
the cost function is further based on at least one of measured surface coverage, duplicative coverage, or coverage time.

16. The robot of claim 1, wherein:
the cost function is further based on each of measured surface coverage, duplicative coverage, or coverage time.

17. The robot of claim 1, wherein:
traversing the zones comprises cleaning a floor under a coverage path in at least some of the zones with a vacuum and measuring coverage with an odometer; and
the zones are adjusted based on distance measured and duplicate coverage detected with the odometer.

18. The robot of claim 1, wherein:
coverage of the workspace by the robot is determined by the robot based on a policy of the robot; and
the operations comprise adjusting the policy to increase a reward of a reward function or reduce a cost of a cost function with an unsupervised reinforcement learning model.

19. The robot of claim 1, wherein segmenting comprises:
detecting an interface between a wall and a doorway indicated by the map; and
determining a boundary between a first zone and a second zone among the plurality of zones based on the detected interface and a distance from the detected interface to a perimeter of the map.

20. The robot of claim 1, wherein segmenting comprises:
selecting a plurality of locations in the map;
determining, for each location among the plurality of locations, a respective plurality of distances to a perimeter of the map at each of a plurality of different angles; and
determining at least some of the plurality of zones based on at least some of the plurality of distances.

21. The robot of claim 20, wherein determining at least some of the plurality of zones based on at least some of the plurality of distances comprises:
selecting a first location on the perimeter where a shortest ray among a plurality of rays from a second location among the plurality of locations intersects the perimeter; and
determining a boundary between a first zone and a second zone among the plurality of zones based on the first location and the second location.

22. A method, comprising:
- obtaining, with one or more processors of a robot, a map of a workspace, the map quantizing the workspace into a plurality of cells, each cell corresponding to an area of the workspace;
- segmenting, with the one or more processors of the robot, the workspace into a plurality of zones, each zone having a subset of the plurality of cells, wherein segmenting the workspace comprises iteratively, until a stopping condition is detected, through a plurality of iterations, adding cells to at least some of the zones based on the added cells being adjacent perimeters of the zones to which the cells are added;
- determining, with the one or more processors of the robot, a sequence of the zones among a plurality of candidate sequences based on an effect of the sequence on a cost of a cost function that is based on travel distance of the robot through the sequence; and
- causing, with the one or more processors of the robot, the robot to traverse the zones in the determined sequence.

23. The robot of claim 1, wherein obtaining the map of the workspace comprises:
- quantizing the workspace into a plurality of cells encoded in a bitmap, each cell encoded in the bitmap corresponding to an area of the workspace and each unit cell encoded in the bitmap having a respective value, wherein at least some of the respective values indicate that the corresponding cell is occupied and at least some of the respective values indicate that the corresponding cell is un-occupied.

\* \* \* \* \*